United States Patent
Yoo

(10) Patent No.: US 9,392,005 B2
(45) Date of Patent: Jul. 12, 2016

(54) SYSTEM AND METHOD FOR MATCHING PATTERN

(75) Inventor: InSeon Yoo, Yongin-Si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 309 days.

(21) Appl. No.: 13/116,419

(22) Filed: May 26, 2011

(65) Prior Publication Data

US 2011/0295894 A1 Dec. 1, 2011

(30) Foreign Application Priority Data

May 27, 2010 (KR) .................. 10-2010-0049566
Jun. 4, 2010 (KR) .................. 10-2010-0052981
May 24, 2011 (KR) .................. 10-2011-0049249

(51) Int. Cl.
*G06F 7/00* (2006.01)
*H04L 29/06* (2006.01)
*G06F 21/56* (2013.01)

(52) U.S. Cl.
CPC .......... *H04L 63/1416* (2013.01); *G06F 21/564* (2013.01); *H04L 63/123* (2013.01)

(58) Field of Classification Search
CPC ................ H04N 21/44008; G06F 17/2872; G06F 3/00; G06F 17/2881; G06F 11/3072; G06F 2207/025; G06K 9/6276; G06K 9/6885
USPC ................. 707/698, 747; 382/159, 170, 181; 704/221; 706/48
See application file for complete search history.

(56) References Cited

U.S. PATENT DOCUMENTS

| | | | | |
|---|---|---|---|---|
| 5,305,389 | A | * | 4/1994 | Palmer .................. 382/305 |
| 5,841,895 | A | * | 11/1998 | Huffman .................. 382/155 |
| 7,539,871 | B1 | | 5/2009 | Osborn |
| 8,578,166 | B2 | * | 11/2013 | De Monseignat .. H04L 63/0823 713/175 |
| 2002/0010702 | A1 | * | 1/2002 | Ajtai et al. .................. 707/101 |
| 2003/0078913 | A1 | * | 4/2003 | McGreevy .................. 707/3 |
| 2003/0144832 | A1 | * | 7/2003 | Harris .................. 704/10 |
| 2005/0015599 | A1 | | 1/2005 | Wang et al. |

(Continued)

FOREIGN PATENT DOCUMENTS

EP 1 744 235 A1 1/2007
JP 2004252642 A 9/2004

(Continued)

OTHER PUBLICATIONS

Communication dated Mar. 21, 2012 from the European Patent Office in counterpart European application No. 11167897.5.

(Continued)

*Primary Examiner* — Mariela Reyes
*Assistant Examiner* — Linh Black
(74) *Attorney, Agent, or Firm* — Sughrue Mion, PLLC

(57) ABSTRACT

System and method for matching a pattern are provided. The pattern matching method includes performing a sub pattern matching operation to match at least one sub data of a plurality of sub data of a target data with a pre-stored pattern data, and performing a full pattern matching operation to determine whether the target data is identical to at least the pre-stored pattern data by referring to a result of the sub pattern matching operation, and wherein the full pattern matching operation is performed or not performed according to a type of the pre-stored pattern data. Accordingly, an accurate matching operation is performed with respect to the target data of various patterns.

18 Claims, 14 Drawing Sheets

(56) References Cited

U.S. PATENT DOCUMENTS

| | | | |
|---|---|---|---|
| 2006/0274114 A1* | 12/2006 | Silverbrook et al. | 347/43 |
| 2007/0150469 A1 | 6/2007 | Simonyi | |
| 2007/0192863 A1* | 8/2007 | Kapoor et al. | 726/23 |
| 2007/0240218 A1 | 10/2007 | Tuvell et al. | |
| 2007/0240222 A1* | 10/2007 | Tuvell | G06F 21/56 726/24 |
| 2008/0071783 A1* | 3/2008 | Langmead et al. | 707/6 |
| 2008/0140662 A1* | 6/2008 | Pandya | 707/6 |
| 2009/0238474 A1* | 9/2009 | Sandberg | G06K 9/723 382/229 |
| 2009/0307776 A1* | 12/2009 | Curnyn | 726/24 |
| 2010/0057737 A1* | 3/2010 | Srinivasan et al. | 707/6 |
| 2010/0077481 A1 | 3/2010 | Polyakov et al. | |

FOREIGN PATENT DOCUMENTS

| | | |
|---|---|---|
| JP | 2007528040 A | 10/2007 |
| KR | 100770357 B1 | 10/2007 |
| WO | 03090050 A2 | 10/2003 |
| WO | WO 2008/005772 A2 | 1/2008 |
| WO | 2009143272 A1 | 11/2009 |

OTHER PUBLICATIONS

Liu et al, "A Fast String-Matching Algorithm for Network Processor-Based Intrusion Detection System," ACM Transactions on Embedded Computing Systems, vol. 3, No. 3, pp. 614-633, Aug. 1, 2004.

Sourdis et al., "Packet Pre-filtering for Network Intrusion Detection," Architecture for Networking and Communications Systems, Proceedings of the 2006 ACM/IEEE Symposium, pp. 183-192, Dec. 3, 2006.

Office Action, dated Sep. 1, 2012, issued by the Korean Intellectual Property Office in counterpart Korean Application No. 10-2011-0049249.

Communication dated Sep. 13, 2011, issued by the European Patnet Office in counterpart European Application No. 11167897.5.

Sourdis, Ioannis et al., "Packet Pre-filtering for Network Intrusion Detection", Architecture for Networking and Communication Systems, Proceedings of the 2006 ACM/IEEE Symposium, Dec. 3, 2006, pp. 183-192.

Communication dated Apr. 23, 2013 from the Japanese Patent Office in counterpart application No. 2011-119458.

* cited by examiner

| Pattern |
|---|
| c74424?????(40/41)00[-10]8b[4-6]01db*015c24014c[10-20]24015c24 |

| Sub Pattern | c74424?????(40/41)00 | 8b[4-6]01db | 015c24014c | 24015c24 |
|---|---|---|---|---|

SYSTEM AND METHOD FOR MATCHING PATTERN

CROSS-REFERENCE TO RELATED APPLICATIONS

This application claims priorities from Korean Patent Application No. 10-2010-0049566, filed on May 27, 2010, Korean Patent Application No. 2010-0052981, filed on Jun. 4, 2010, and Korean Patent Application No. 10-2011-0049249, filed on May 24, 2011 in the Korean Intellectual Property Office, the disclosure of which is incorporated herein by reference in its entirety.

BACKGROUND

1. Field

Methods and apparatuses consistent with exemplary embodiments relate system and method for matching patterns, and more particularly, to system and method for swiftly matching a variety of malware patterns which are grammatically complex or simple with a target data.

2. Description of the Related Art

As the Internet has been widely used, invasion of various forms such as worms, Trojan horses, viruses, and DDos has recently appeared with a greater ripple effect. Therefore, there is a demand for methods and apparatuses for dealing with the network invasion to protect information over networks. The most fundamental technique to achieve this is a high-speed pattern matching technique.

In general, the pattern matching technique has been used for multiple purposes in diverse fields from a system for searching for desired letters from a long text file to a security system for detecting network invasion or viruses, a spam mail removing system, or a database system. In particular, a pattern matching method for searching for a specific text line from a payload part of a packet is a core technique in the invasion detecting or blocking system for detecting abnormal activities using a rule.

System administrators use such an invasion detecting or blocking system in order to protect their internal networks from malicious attacks. However, as the malicious attacks become diversified and the number of attacks increases, the number of pattern matching rules to detect the attacks increases. As the number of rules increases, the pattern matching cost of the invasion detecting or blocking system is on the increase In general, an anti-virus system-on chip (SOC) is mounted in mobile devices such as laptops, smart phones, net-books, or connected devices, which are connected to networks, so that virus-infected files can be found through scanning, searching, and matching of malicious codes.

Such an anti-virus program finds a virus pattern from a data file which has been read out by scanning a file. However, the scanning operation in the mobile devices requires many resources of a central processing unit (CPU) and a memory and thus it is not easy for a user to use a desired program when detecting viruses due to a resource problem.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide system and methods for swiftly matching a variety of malware patterns which are grammatically complex or simple.

One or more exemplary embodiments also provide system and methods for matching a pattern, in which a full matching operation is performed only if a hash matching operation and a sub matching operation are successful, and thus a pattern matching operation can be swiftly performed even if a target data to be pattern-matched is greater.

According to an aspect of an exemplary embodiment, there is provided a pattern matching method comprising performing a sub pattern matching operation to match at least one sub data of a plurality of sub data of a target data with a pre-stored pattern data; and performing a full pattern matching operation to determine whether the target data is identical to at least the pre-stored pattern data by referring to a result of the sub pattern matching operation, wherein the full pattern matching operation is performed or not performed according to a type of the pre-stored pattern data.

According to an aspect of another exemplary embodiment, there is provided a pattern matching method comprising performing a light pattern matching operation to match a part of one of a plurality of sub data of a target data with a pattern data of a pre-stored pattern database, and performing an exact pattern matching operation to match a whole of the sub data with the light-pattern matched pattern data only if the part of the one sub data is identical to or included in the pattern data.

According to an aspect of still another exemplary embodiment, there is provided a pattern matching system, comprising a storage unit which stores a hash matcher table comprising a hash value for a pattern data, a hash value matching unit which matches a hash value of at least one sub data of a plurality of sub data of a target data with the hash matcher table, and a sub pattern matching unit which matches a pattern data matched with the hash value of the sub data with the sub data.

According to an aspect of still another exemplary embodiment, there is provided a pattern matching system, comprising a sub pattern matching unit which matches at least one sub data of a plurality of sub data of a target data with a pre-stored pattern data, a full pattern matching unit which matches the target data with a whole of the pre-stored pattern data, and a determination unit which determines whether to operate the full pattern matching unit according to a type of the pre-stored pattern data.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Exemplary embodiments will now be described more fully with reference to the accompanying drawings to clarify aspects, features and advantages of the invention. This invention may, however, be embodied in many different forms and should not be construed as limited to the exemplary embodiments set forth herein. Rather, these embodiments are provided so that this disclosure will be thorough and complete, and will fully convey the scope of the invention to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular embodiments only and are not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items.

Figure 1:
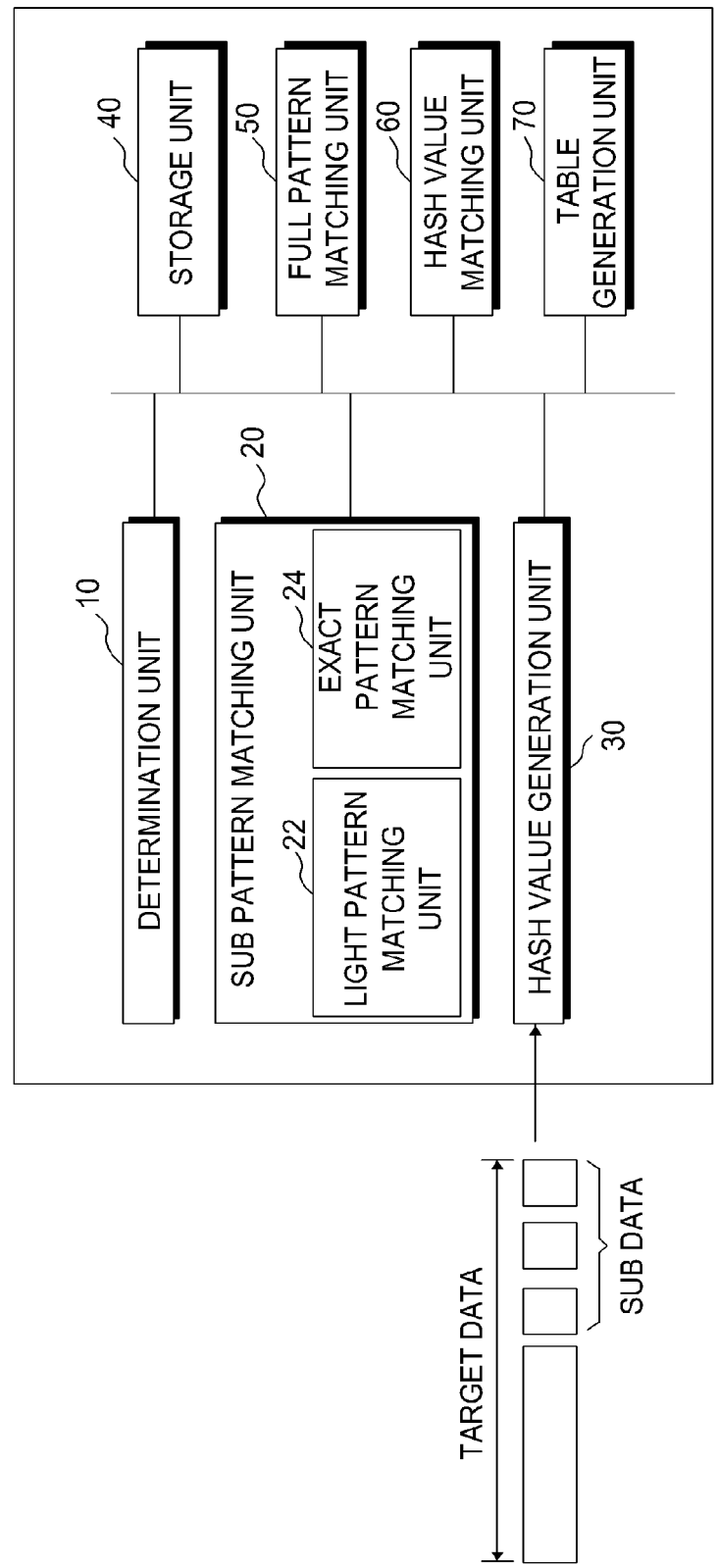
FIG. 1 is a block diagram illustrating a pattern matching system according to an exemplary embodiment.
Figure 2:
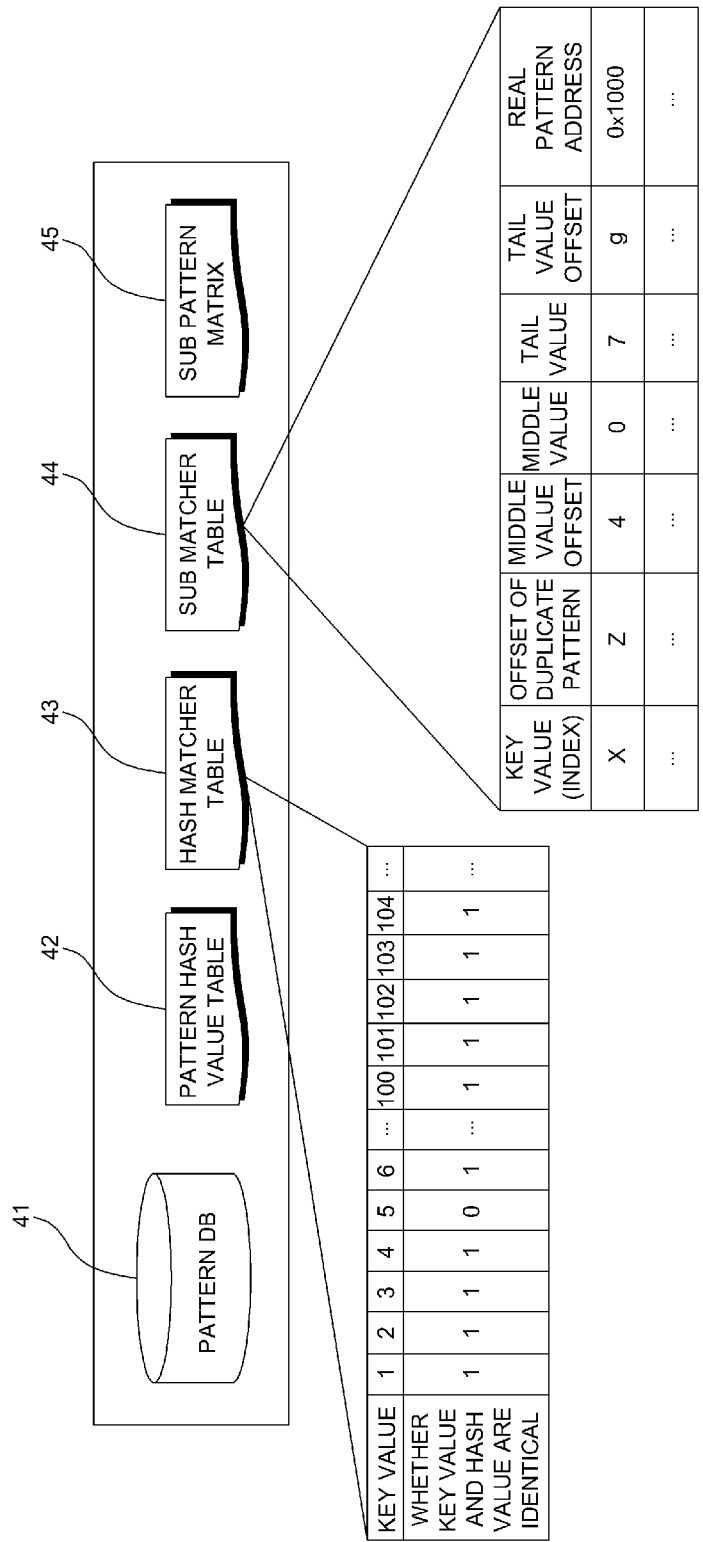
FIG. 2 is a block diagram illustrating a storage unit of the pattern matching system of FIG. 1.

FIG. 1 is a block diagram illustrating a pattern matching system according to an exemplary embodiment, and FIG. 2 is a block diagram illustrating a storage unit of the pattern matching system of FIG. 1.

Referring to FIG. 1, a pattern matching system according to an exemplary embodiment comprises a determination unit 10, a sub pattern matching unit 20, a hash value generation unit 30, a storage unit 40, a full pattern matching unit 50, a hash value matching unit 60, and a table generation unit 70.

The determination unit 10 determines what kind of pattern has been matched with a sub pattern matched target data and determines whether to perform a full pattern matching operation or not according to the result of determination. According to an exemplary embodiment, if a sub data is matched with a part of a grammatically complex pattern data, the full pattern matching operation is performed. On the other hand, if the sub data is matched with a simple pattern data, a sub pattern matching operation is performed but the full pattern matching operation is not performed.

According to an exemplary embodiment, the determination unit 10 may refer to information indicating a type of malware pattern data (hereinafter, referred to as 'pattern data type information') in order to determine what kind of pattern data has been matched with the target data. According to an exemplary embodiment, the pattern data type information may be included in a hash matcher table 43, a sub matcher table 44, and/or a sub pattern matrix 45. However, the pattern data type information may be stored in a separate table. If the separate table is provided, the pattern data type information may be stored in the storage unit 40 or a separately provided storage unit (not shown).

The sub pattern matching unit 20 sequentially matches a plurality of sub data of the target data with a pattern data pre-stored in a pattern database 41. According to an exemplary embodiment, the sub pattern matching unit 20 may perform a sub pattern matching operation using the hash matcher table 43 and the sub matcher table 44. A function of the sub pattern matching unit 20 may be implemented by hardware and/or software.

The sub pattern matching unit 20 may comprise two-step matching operations, i.e., a light pattern matching operation and an exact pattern matching operation. The sub pattern matching unit 20 is operated only if the hash value of the sub data is identical to the hash value in the hash matcher table (i.e., the hash matching by the hash value matching unit 60 is successful).

According to an exemplary embodiment, the sub pattern matching unit 20 may comprise a light pattern matching unit 22 and an exact pattern matching unit 24.

Figure 3:
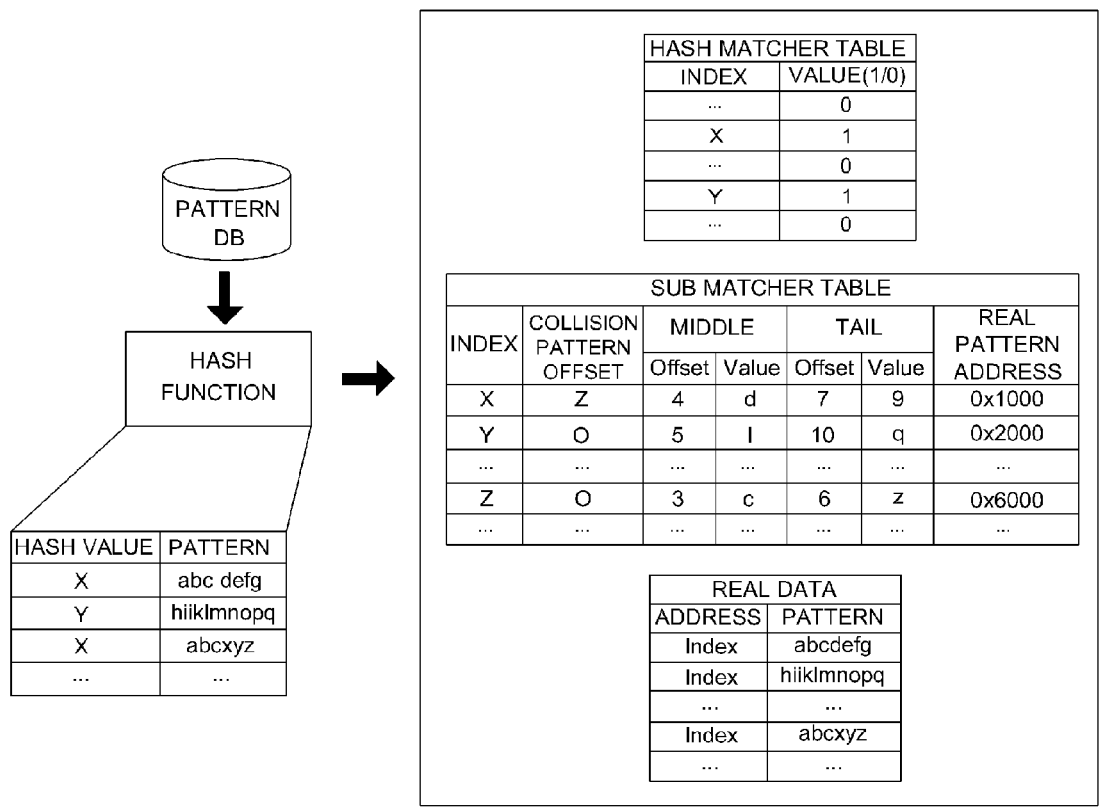
FIG. 3 is a view illustrating a table configuration according to an exemplary embodiment.

The light pattern matching unit 22 performs the first operation of the sub pattern matching unit 20, i.e., the light pattern matching operation to match a part of the sub data with the pattern data. To achieve this, the light pattern matching unit 22 may use the sub matcher table 44. Referring to FIG. 3, the sub matcher table 44 comprises a middle value and a tail value and the light pattern matching unit 22 matches the sub data with the pattern data using the middle value and the tail value of the sub matcher table 44. Specifically, the light pattern matching operation determines whether the middle value and the tail value of the sub data are identical to those of the pattern data in matching the sub data with the pattern data. According to an exemplary embodiment, if the at least two values, i.e., the middle value and the tail value of the sub data are identical to those of the pattern data, it is highly likely that the remaining values are identical. Therefore, the light pattern matching operation is performed for the purpose of increasing a matching speed. If the middle value and the tail value of the sub data are identical to those of the pattern data, the sub pattern matching unit 20 performs the exact pattern matching operation of comparing all of the sub data and the pattern data. Meanwhile, if there is a hash collision, even different pattern data may have the same hash value. Referring to FIG. 3, patterns 'abcdefg' and 'abcxyz' have the same hash value 'X'. In case that there is the hash collision, the sub matcher table 44 may further comprise an item 'collision pattern offset'. Referring to the sub matcher table 44 of FIG. 3, an index 'X' is linked with an index 'Z' through the item 'collision pattern offset'.

For example, if a hash value for a certain sub data is 'X', the light pattern matching unit 22 performs the light pattern matching operation with respect to the index 'X'. In other words, a middle value and a tail value of the sub data are matched with a middle value 'd' and a tail value '9' of the index 'X', respectively.

If the matching is not successful, the light pattern matching unit 22 performs the light pattern matching operation with respect to 'Z' displayed on the item 'collision pattern offset' of the index 'X'. In other words, the middle value and the tail value of the sub data are matched with a middle value 'c' and a tail value 'z' of 'Z'. If this matching is successful, the light pattern matching operation is performed. If there is no value matched as a result of the light pattern matching operation, it is checked whether there is a value displayed on in the item 'collision pattern offset' of the index 'Z'. If there is a value displayed on the item of 'collision pattern offset' of the index 'Z', the sub pattern matching operation is performed again as described above.

The exact pattern matching unit 24 performs the second operation of the sub pattern matching unit 20, i.e., the exact pattern matching operation to match all of the sub data and the pattern data.

According to an exemplary embodiment, the exact pattern matching unit 24 may perform the exact pattern matching operation with respect to only the sub data that have successfully undergone the light pattern matching operation.

According to an exemplary embodiment, the exact pattern matching unit 24 may perform the exact pattern matching operation with reference to the sub matcher table 44 and the pattern database 41. Referring to FIG. 3, the exact pattern matching unit 24 performs the exact pattern matching operation by comparing the sub data with a pattern data stored in an address designated by a real data address included in the sub matcher table 44. The address designated by the real data address included in the sub matcher table 44 may be an address of a memory in which the pattern DB 41 is stored or an address of a memory in which a pattern hash value table 42 is stored. Alternatively, the address may be an address of a separate memory in which the pattern data is stored.

The hash value generation unit 30 generates hash values for the sub data of the target data. The hash value generation unit 30 generates the hash values for the sub data by applying a hash function, and may use a hash function and a hash coefficient that may rarely cause a hash collision.

According to an exemplary embodiment, the hash value generation unit 30 may generate the hash values using the whole sub data or a part of the sub data as an input value, and the generated hash value is used in the hash value matching unit 60. If the part of the sub data is used as the input value, a plurality of hash values may be generated for one sub data. For example, if the sub data is 8 bytes long, the hash value generation unit 30 may generate a hash value using a first byte, a second byte, and a third byte of the sub data as an input value. Next, the hash value generation unit 30 may generate a hash value using the second byte, the third byte, and a fourth byte as an input value. Next, the hash value generation unit 30 may generate a hash value using the third byte, the fourth, and a fifth byte as an input value. This process may be performed with respect to the remaining bytes.

The hash value generation unit 30 may be implemented as hardware and/or software. For example, the hash value may be generated by the hash function that is stored in a storage unit such as a register and loaded into a memory (not shown) from the storage unit. Generating the hash value using the hash function is well known in the related art and thus a detailed description thereof is omitted.

The storage unit 40 may store all data that is necessary for the pattern matching system of the present disclosure. Referring to FIG. 2, the storage unit 40 will be explained in detail. The storage unit 40 may comprise the pattern database 41, and may store the pattern hash value table 42, the hash matcher table 43, the sub matcher table 44, and the sub pattern matrix 45 in predetermined storage areas.

In this embodiment, the storage unit 40 may be one of storage media such as a hard disk, a volatile memory and/or a non-volatile memory, and a read only memory (ROM). In this embodiment, the pattern hash value table 42, the hash matcher table 43, the sub matcher table 44, and the sub pattern matrix 45 are stored in one storage unit 40. However, this is merely an example. It should be understood that the pattern hash value table 42, the hash matcher table 43, the sub matcher table 44 and the sub pattern matrix 45 may be stored in different storage media. For example, the above-described tables may be stored in a volatile memory, whereas the pattern database 41 may be stored in a storage medium such as a hard disk. The pattern database 41 is a database containing pattern data to be used in the matching operations of the sub pattern matching unit 20 and the full pattern matching unit 50. In this embodiment, the pattern database 41 may be a collection of pattern data of a grammatically defined simple pattern, a collection of pattern data of a grammatically complex pattern, or a mixture of the pattern data of the grammatically simple pattern and the pattern data of the grammatically complex pattern. In this embodiment, the pattern database 41 may further comprise information indicating a type of pattern data. The pattern hash value table 42 comprises hash values of the patter data stored in the pattern database 41. In the pattern hash value table 42, at least one hash value may correspond to one pattern data. For example, if a pattern data is 16 bytes long, a hash value generation unit generates a hash value using a first byte, a second byte, and a third byte of the pattern data as an input value, generates a hash value using the second byte, the third byte, and a fourth byte as an input value, and generates next hash values using the remaining bytes in the same manner, while moving by one byte. The hash values generated as described above are included in the pattern hash value table 42 with corresponding pattern data. The hash value generation unit for generating the hash values for the pattern data may be the hash value generation unit 30 of FIG. 1 or may be a separately provided hash value generation unit (not shown).

The hash matcher table 43 is a table indicating presence/absence of the hash value for the pattern data. According to an exemplary embodiment, the hash matcher table 43 may be configured in the following forms:

First, the hash matcher table 43 may comprise a hash value item displaying hash values and an item displaying pattern data of the pattern database 41 as in table 1:

TABLE 1

| Index (or Hash Value) | Pattern |
|---|---|
| ... | |
| X | abcdefg |
| ... | |
| Y | hijklmnopq |

Second, the hash matcher table 43 may comprise a hash value item displaying hash values, and an item indicating whether the hash values of the pattern data of the pattern database 41 are identical to the hash values displayed on the hash value item (the hash matcher table of FIGS. 2 and 3).

FIGS. 2 and 3 illustrate examples of the hash matcher table 43 of the second form. A key value item displays the hash values that can be generated by a specific hash function. The item on the second row displays '1' only if the key value(s) is identical to the hash value of the pattern data. The specific hash function may be the same as that used in the hash value generation unit 30.

The sub matcher table 44 is a table that is used for the matching operation of the light pattern matching unit 22 of the sub pattern matching unit 20.

According to an exemplary embodiment, the sub matcher table 44 may comprise a hash value item displaying hash values, and a pattern data item displaying pattern data corresponding to the hash values displayed on the hash value item. The pattern data item may display addresses in which the pattern data are stored or pattern data itself. Also, the sub matcher table 44 may further comprise a middle value item displaying middle values of the pattern data and a tail value item displaying table values of the pattern data.

As shown in FIG. 2, the pattern data item of the sub matcher table 44 may comprise a duplicate pattern offset item, a middle value offset item, a middle value item, a tail value offset item, a tail value item, and a real pattern information item. The real pattern information item may display real pattern data itself or address in which the pattern data are stored.

The sub pattern matrix 45 comprises a sub pattern matching result for each of sub data of a target data.

According to an exemplary embodiment, the sub pattern matrix 45 may comprise a matching result of each sub data of a target data. For example, if the target data consists of five sub data, the sub pattern matrix 45 may comprise pattern matching results for the five sub data. The sub pattern matrix 45 is used for the full pattern matching operation and may comprise all pattern matching results of the sub data that are necessary for the full pattern matching operation with the pattern data.

According to an exemplary embodiment, the sub pattern matrix 45 comprises the pattern matching result of the sub data, if the sub data is determined to be a part of a complex pattern as a result of the exact pattern matching for the sub data.

The full pattern matching unit 50 performs the full pattern matching operation of matching the sub data included in the sub pattern matrix 45 with the pattern data using the sub pattern matrix 45. According to an exemplary embodiment, the full pattern matching unit 50 may perform the full pattern matching operation every time that the matching by the sub pattern matching unit 20 is successful. Alternatively, the full pattern matching unit 50 may perform the full pattern matching operation every time that the matching result by the sub pattern matching unit 20 is output regardless of whether the matching by the sub pattern matching unit 20 is successful or not.

According to an exemplary embodiment, the full pattern matching unit 50 may pattern-match each of the sub pattern matching results of the sub data of the target data with all of the pattern data. The full pattern matching unit 50 may be implemented by hardware and/or software.

The hash value matching unit 60 performs a matching operation between the hash value generated by the hash value generation unit 30 and the hash matcher table 43. A result of the matching operation by the hash value matching unit 60 is used for the sub pattern matching operation of the sub pattern matching unit 20.

For example, referring to FIG. 3, the operation of the hash value matching unit 60 will be explained, assuming that the hash value for the sub data is 'X'. Referring to FIG. 3, the hash value matching unit 60 may know that there is a pattern having the hash value 'X' using the hash matcher table 43 in a hardware and/or software level, and output a result of 'identical' or 'successful'.

The table generation unit 70 may generate a table necessary for the pattern matching operation of the pattern matching system of the present disclosure, such as the pattern hash value tale 42, the hash matcher table 43, the sub matcher table 44, and/or the sub pattern matrix 45. The table generated by the table generation unit 70 may be stored in a corresponding storage area of the storage unit 40. The table generated by the table generation unit 70 has been described with reference to FIG. 2.

In this embodiment, the tables 43, 44, 45 are generated by one table generation unit 70. However, this is merely an example. The tables may be generated by a separately provided table generation unit.

The table generation unit 70 may generate a pattern hash value table that displays hash values for all cases with respect to the pattern data of the pattern database 41. According to an exemplary embodiment, the table generation unit 70 may generate hash values for the pattern data using the hash value generation unit 30 or a separately provided hash value generation unit (not shown), and arrange the hash values in the form of a pattern hash value table (see the table of FIG. 3 comprising the hash value item and the pattern item as in FIG. 3).

According to an exemplary embodiment, the pattern hash value table 42 may be used when the table generation unit 70 generates the hash matcher table 43. According to an exemplary embodiment, the table generation unit 70 may generate the hash matcher table 43. For example, the table generation unit 70 may generate hash values for the pattern data using the hash value generation unit 30 or a separately provided hash value generation unit (not shown), and arrange the hash values in the form of a hash matcher table. Alternatively, the hash matcher table 43 may be generated with reference to the pattern hash value table 42. According to an exemplary embodiment, the table generation unit 70 may generate the sub matcher table 44 with reference to the hash matcher table 43, the pattern hash value table 42, and the pattern database 41.

If the pattern database 41 has changed, the table generation unit 70 may newly generate the above-described tables. At this time, the table generation unit 70 may update the tables by reflecting only the changed part or newly generate the tables in whole.

As described above with reference to FIG. 1, the pattern matching system distinguishes between the simple pattern and the complex pattern in performing the pattern matching operation. In other words, according to an exemplary embodiment, if the sub pattern matching is successful and if a sub data is a simple pattern, the full pattern matching operation is not performed and the matching operation of the target data finishes. On the other hand, if matching has been achieved as a result of sub pattern matching of a target data and if a sub data is a part of a complex pattern, the full pattern matching operation is performed. For convenience of understating, it is assumed that a target data consists of five sub data. If a result of sub pattern matching of the first sub data is successful and if the first sub data is a simple pattern, the pattern matching operation is not performed with respect to the remaining four sub data and also the full pattern matching operation is not performed. On the other hand, if the result of sub pattern matching of the first sub data is successful and if the first sub data is a part of a complex pattern, the matching result of the first sub data is included in the sub pattern matrix 45 and the sub pattern matching operation is performed with respect to the second sub data. In the same manner, the sub pattern matching operation is performed with respect to the remaining sub data and the results of the sub pattern matching are included in the sub pattern matrix 45. The full pattern matching operation is performed based on the sub pattern matrix 45.

It is possible to vary the embodiment of FIG. 1 in various forms.

As a first variation, it is assumed that there is only a pattern data of a grammatically simple pattern. In this case, the full pattern matching unit 50 is not included and the sub pattern matrix 45 is not generated. Only the sub pattern matching operation is performed with respect to all of target data. Also, in this case, the pattern database 41 may store only the pattern data of the grammatically simple pattern.

As a second variation, it is assumed that there is only a pattern data of a grammatically complex pattern. In this case, the full pattern matching operation is performed with respect all of sub data of a target data until the full pattern matching is completed with respect to the target data. In other words, the full pattern matching operation is performed every time that the sub pattern matching operation for the sub data is performed or every time that the result of sub pattern matching is successful.

As described above, the pattern matching system comprising the determination unit 10, the sub pattern matching unit 20, the hash value generation unit 30, the storage unit 40, the full pattern matching unit 50, the hash value matching unit 60, and the table generation unit 70 as described above with reference to FIG. 1 may be realized by being mounted in a system on chip (SoC) or a personal computer and a smart card.

FIG. 3 is a view illustrating a table configuration according to an exemplary embodiment.

The hash value generation unit 30 according to an exemplary embodiment loads pattern data from the pattern database 41 and generates a hash value for each pattern data using a specific hash function, and stores the hash value generated for each pattern data in the pattern hash value table 42. The pattern hash value table 42 may be generated with hash values generated by a separately provided hash value generation unit (not shown) other than the hash value generation unit 30. However, the separately provided hash value generation unit uses the same hash function and hash coefficient as those of the hash value generation unit 30.

The table generation unit 70 may generate the hash matcher table 43 and the sub matcher table 44 using the pattern hash value table 42. The hash matcher table 43 is used for the hash value matching unit 60 to determine whether there is pattern data having the same hash value. The sub matcher table 44 is used only if hash matching is successful.

The full pattern matching operation for the whole pattern data is performed only if the sub pattern matching operations using the hash matcher table 43 and the sub matcher table 44 are successful.

The tables of FIG. 3 are merely an example and the present disclosure is not limited to these tables. Although the pattern data type information is not included in FIG. 3, the pattern data type information may be further included. For example, the sub matcher table 44 may further comprise the pattern data type information so that the determination unit 10 can determine whether to perform the full pattern matching operation or not with reference to the sub matcher table 44.

Figure 4:
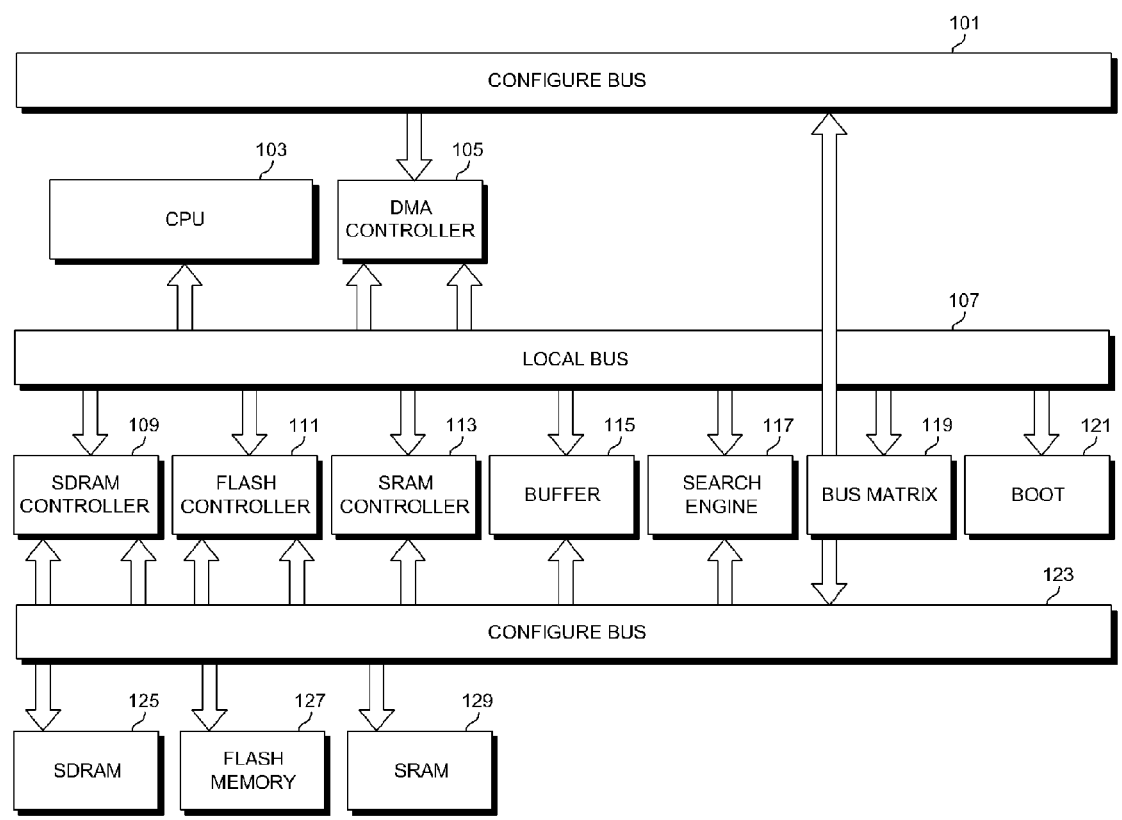
FIG. 4 is a block diagram illustrating a pattern matching system which is implemented in the form of a SoC according to an exemplary embodiment.

FIG. 4 is a block diagram illustrating a pattern matching system realized in the form of a SoC according to an exemplary embodiment.

Referring to FIG. 4, the pattern matching system realized in the form of the SoC comprises configure buses 101, 123, a central processing unit (CPU) 103, a direct memory access (DMA) controller 105, a local bus 107, a synchronous dynamic random access memory (SDRAM) controller 109, a flash controller 111, a static random access memory (SRAM) controller 113, a buffer 115, a search engine 117, a bus matrix 119, and a boot 121.

In the pattern matching system of FIG. 4, the bus for data transmission between blocks is divided into the local bus 107 for swift transmission of data and the configure buses 101, 123 for configuration. In this embodiment, the local bus 107 and the configure buses 101, 123 may meet an advanced high performance bus (AHB) standard, but this is merely an example. The bus used in the present disclosure is not necessarily a configure bus and a bus of other standard may be used. In this embodiment, the configure buses 101, 123 may be connected to each other.

The CPU 103 performs a central processing operation with respect to a job that is required to control an overall operation of the pattern matching system. The CPU 103 may be a reconfigurable CPU, but any other CPU may be used.

The DMA controller 105 controls a DMA and the buffer 115 temporarily stores data through an interface with an external source.

The search engine 117 may be hardware to receive a target data and a pattern data and perform a pattern matching operation with respect to the target data and the pattern data. For example, the search engine 117 may perform the pattern matching operation with respect to the target data with reference to the tables illustrated in FIG. 2.

The bus matrix 119 converts a control signal and a data signal of the AHB standard into a control signal and a data signal of an advanced peripheral bus (APB) standard or converts a control signal and a data signal of the APB standard into a control signal and a data signal of the AHB standard, and transmits the converted signals.

The boot 121 initializes the pattern matching system in the SoC.

In this embodiment, as a memory, the pattern matching system comprises an SDRAM 125, a flash memory 127, and an SRAM 129. Accordingly, the SRAM controller 109 for controlling an input and output of the SRAM 125, the flash controller 111 for controlling an input and output of the flash memory 127, and the SRAM controller 113 for controlling an input and output of the SRAM 129 are provided. The SDRAM 125, the flash memory 127, and the SRAM 129 may be included in the storage unit 40 of FIG. 1.

In the pattern matching system described with reference to FIG. 1 and its variations, the determination unit 10, the sub pattern matching unit 20, the hash value generation unit 30, the full pattern matching unit 50, the hash value matching unit 60, and the table generation unit 70 may be implemented by software and/or hardware, and the search engine 117 is an element that implements the hash value matching operation and the sub pattern matching operation in a hardware level. An element implemented in a software level is stored in a storage medium such as the SDRAM 125 or the SRAM 129 and controls the search engine 117 to perform the matching operation.

Figure 5:
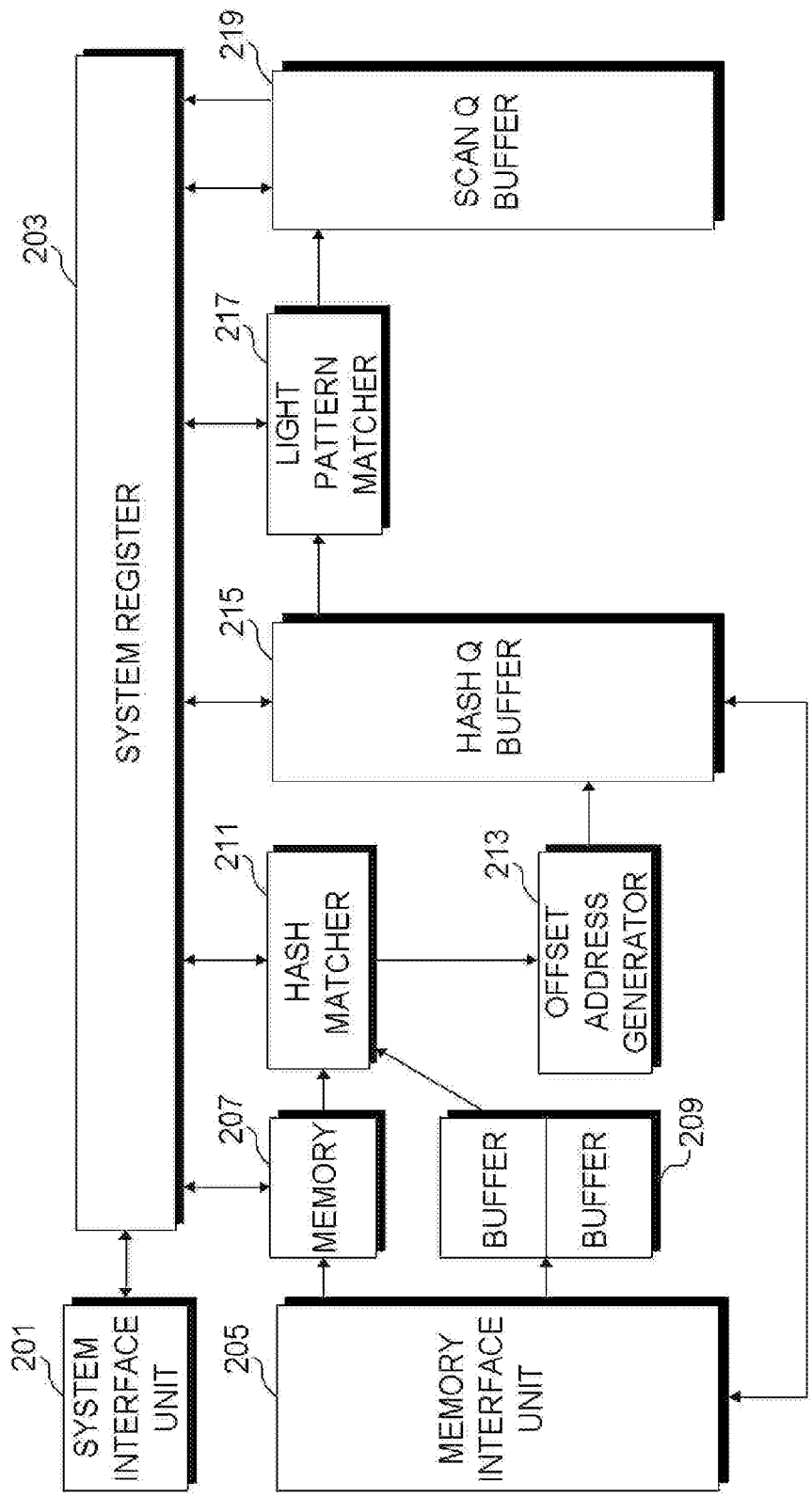
FIG. 5 is a block diagram illustrating a hardware configuration of a search engine of the pattern matching system of FIG. 4.

FIG. 5 is a block diagram illustrating a hardware configuration of the search engine 117 of FIG. 4.

Referring to FIG. 5, the search engine 117 may include a system interface unit 201, a system register 203, a memory interface unit 205, a memory 207, a buffer 209, a hash matcher 211, an offset address generator 213, a hash Q buffer 215, a light pattern matcher 217, and a scan Q buffer 219.

Figure 6:
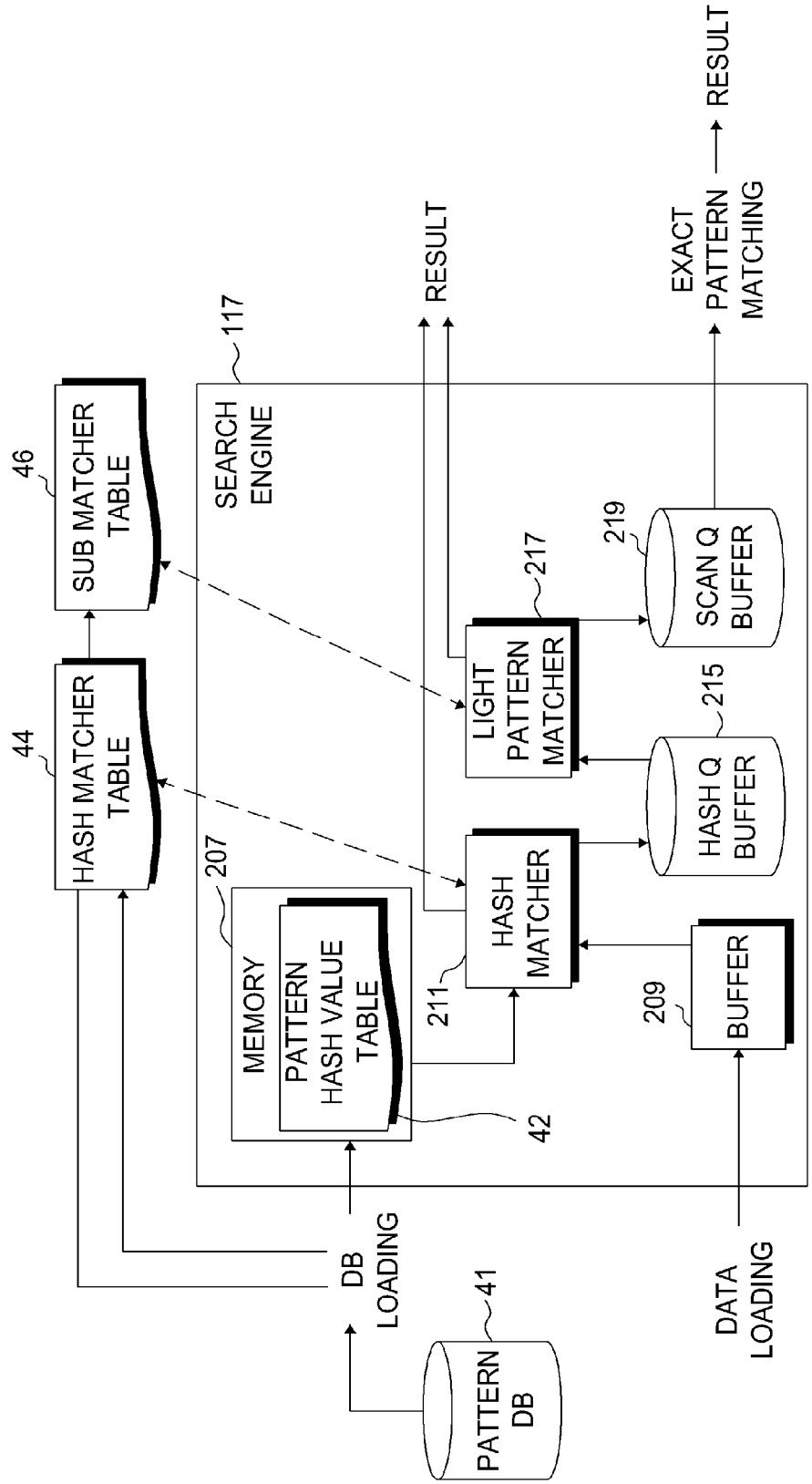
FIG. 6 is a view to explain an operation of processing a grammatically defined simple pattern data in the pattern matching system of FIG. 5.

According to an exemplary embodiment, the search engine 117 performs the hash value matching operation and the sub pattern matching operation, and the full pattern operation is implemented in a software level as illustrated in FIG. 6.

The system interface unit 201 supports an interface between the pattern matching system and an external source, and the memory interface unit 205 is used to read out contents from a database or a file stored in the pattern matching system.

The memory 207 may store the pattern hash value table 42 described above with reference to FIGS. 1 to 3, and may be moved to the system register 203 if necessary. The pattern hash value table 42 stored in the memory 207 may be a table generated by a hash value generator (not shown). According to an exemplary embodiment, the hash value generator (not shown) may be implemented by software. For example, a hash function is stored in the system register 203 such that the hash value generator generates a hash value for a pattern data using the hash function stored in the system register 203. The buffer 209 stores target data sequentially read out from the memory interface unit 205. According to an exemplary embodiment, the buffer 209 may sequentially receive and store sub data of the target data. In this embodiment, the buffer 209 is configured in the form of a dual bank. However, this is merely an example and the buffer 209 may be realized as a single buffer. However, in the case of a dual bank type buffer, two buffers alternately provide the sub data to the hash matcher 211 so that a matching speed can be enhanced.

Data input to the hash matcher 211 comprises the sub data and its hash values. In other words, the sub data output from the buffer 209 is input to the hash value generator (not shown) such that its hash value is generated, and the hash value is input to the hash matcher 211 along with the sub data.

The hash matcher 211 matches the hash value of the sub data with the hash matcher table 43. The hash matcher table 43 may be stored in the system register 203 or in a separately provided memory (not shown). The hash matcher table 43 recited herein is the hash matcher table described with reference to FIGS. 1 to 3, and may be generated by the table generator (not shown).

The hash matcher 211 stores the sub data in the hash Q buffer 215 only if the hash value s are matched with each other (i.e., the hash matching is successful).

The offset address generator 213 generates a predetermined memory address value if the hash matching is successful as a result of hash matching of the hash matcher 211. More specifically, an address value of a memory storing the successfully hash-matched hash value in the sub pattern matching table is generated. For example, in FIG. 3, if the hash value of the sub data is 'X' as a result of hash matching, the offset address generator 213 generates a memory address storing a record having an index 'X' in the sub matcher table.

The hash Q buffer 215 matches the successfully hash-matched sub data with the address generated by the offset address generator 213 and stores the sub data and the address.

The light pattern matcher 217 is hardware that performs a light pattern matching operation with respect to the sub data stored in the hash Q buffer 215 in sequence. According to an exemplary embodiment, the light pattern matcher 217 corresponds to the light pattern matching unit 22 of FIG. 1 in its function. The light pattern matcher 217 reads out the sub data stored in the hash Q buffer 215 and data stored in the memory address corresponding to the sub data (for example, a record of an index 'X'), and matches the sub data and the data of the memory address. The data readout from the memory is data included in the sub pattern matcher table.

According to an exemplary embodiment, if the data read out from the memory contains a collision pattern offset, the light pattern matcher 217 additionally reads out data designated by the collision pattern offset and performs the light pattern matching operation again.

According to an exemplary embodiment, if the light pattern matching for the pattern data having the index 'X' in the sub matcher table fails or if the exact pattern matching fails, the light pattern matcher 217 reads out a pattern data indicated by a value Z indicated by the collision pattern offset (in other words, pattern data of the index 'Z'). The scan Q buffer 219 may store sequently the sub data that have successfully undergone the light pattern matching, after the matching operation of the light pattern matcher 217. After that, the exact pattern matching operation is performed with respect to the sub data stored in the scan Q buffer 219.

Albeit not shown in FIG. 5, the hash matcher table 43 and the sub matcher table 44 used for the hash matching operation by the hash matcher and the light pattern matching operation by the light pattern matcher 217 may be stored in the system register 203 or a separately provided memory (not shown).

If the present disclosure is realized in the form of the SoC as in FIGS. 4 and 5, a speed is much higher than a speed in a case that the pattern matching is performed by an application in a software level, and a resource problem of a mobile device such as a limited speed or battery can be solved.

FIG. 6 is a view to explain an overall operation of the pattern matching system of FIG. 5.

The hash matcher table 43 is stored in a memory (not shown) and used for the matching operation by the hash matcher 211. According to an exemplary embodiment, the hash matcher table 43 may comprise a key value which is a hash value to be used as an index and information indicating whether the key value is identical to a hash value of the pattern. If the hash value generator (not shown) loads pattern data from the pattern database 41 and generates a hash value, the hash matcher table 44 and the pattern hash value table 42 may be generated based on the hash value. The pattern hash value table 42 may be stored in the memory 207.

The sub matcher table 44 is stored in a memory (not shown) and used for the light pattern matching and the exact pattern matching. The sub data of the target data is loaded into the buffer 209 and the loaded sub data and its hash value are provided to the hash matcher 211. The hash matcher 211 is provided with the sub data and the hash value from the buffer 209 and is provided with the hash matcher table 43 from the memory (not shown), and performs the hash matching operation.

After that, the light pattern matcher 217 performs a matching operation with respect to a part of the sub data using the sub matcher table 44, and, if the part of the sub data is identical to or included in the pattern data (i.e. the light pattern matching is successful), the sub data is output to the scan Q buffer 219.

The exact pattern matching operation is performed with respect to the sub data stored in the scan Q buffer 219. The exact pattern matching operation may be performed by the above-described exact pattern matching unit 24 by way of an example.

In this embodiment, the search engine 117 is configured by hardware logic and thus is able to perform a simple and quick job. Since the hash matcher 211, which is a bit table, is small and matches the hash value output by the hash function, it has an advantage of high speed comparing performance. Also, the light pattern matcher 217 accesses using the hash value as an index and thus is able to output a matching result swiftly.

Figure 7:
FIG. 7 is a view to explain a grammatically defined complex pattern data according to an exemplary embodiment.

FIG. 7 is a view to explain a grammatically defined complex pattern data according to an exemplary embodiment.

FIG. 7 illustrates an example of a grammatically defined complex pattern data (hereinafter, referred to as 'multi-pattern data'). The multi-pattern data cannot obtain an accurate pattern matching result in the pattern matching system described in FIGS. 4 to 6.

Therefore, it is necessary to divide one multi-pattern into a plurality of sub patterns in order to perform the pattern matching operation. As shown in FIG. 7, a single multi-pattern data is divided into a plurality of sub patterns according to a predetermined rule.

Figure 8:
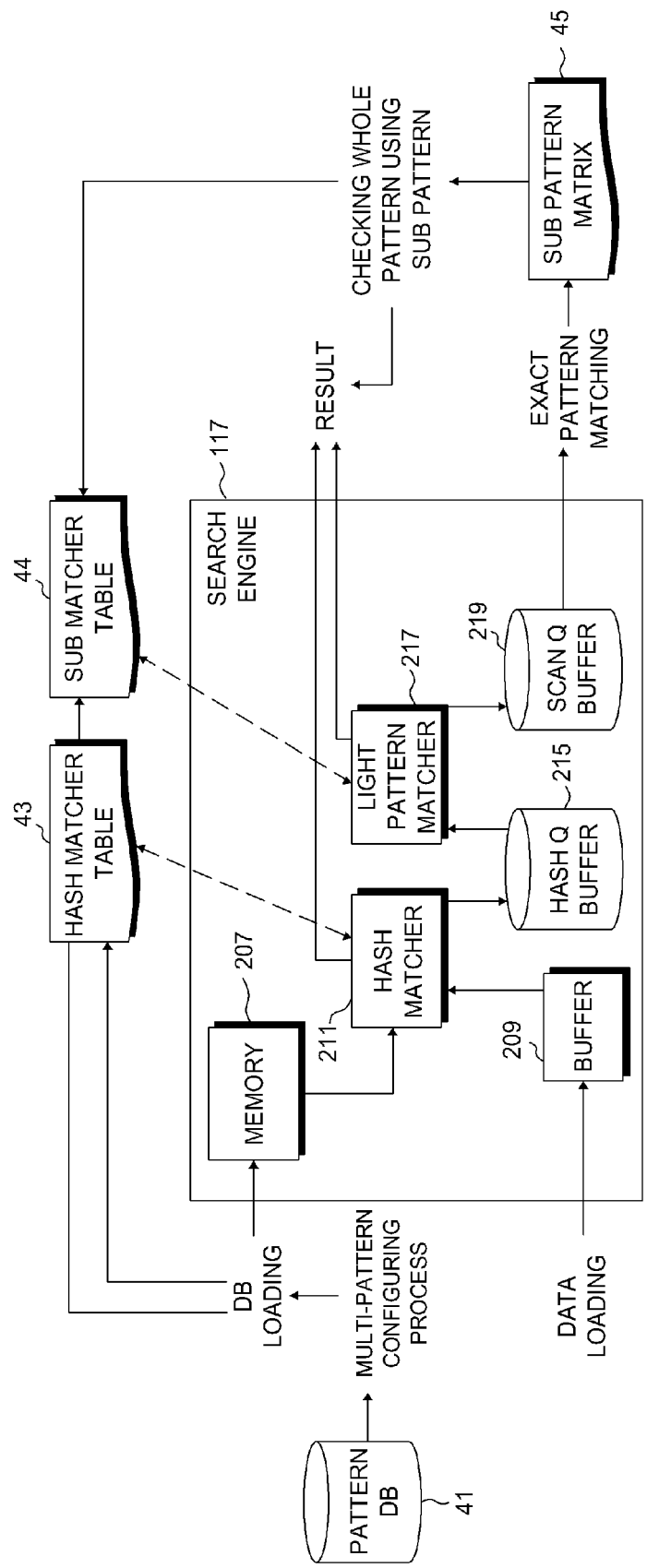
FIG. 8 is a view to explain an operation of processing a grammatically defined complex pattern data in the pattern matching system of FIG. 5.

FIG. 8 is a view to explain an operation of processing a grammatically defined complex pattern data in the pattern matching system of FIG. 5.

The operation illustrated in FIG. 8 is similar to the operation illustrated in FIG. 6. However, FIG. 6 illustrates an operation of processing a grammatically defined simple pattern data, whereas FIG. 8 illustrates an operation of processing a grammatically defined complex pattern data, that is, a multi-pattern data. The operation of processing the multi-pattern data in FIG. 8 further comprises some operations in addition to the operation of FIG. 6 and thus only the additional operations will be explained below.

The pattern data stored in the pattern database 41 are divided into a plurality of sub patterns. This operation is referred to as a 'multi-pattern configuring process'. The multi-pattern configuring process has been explained with reference to FIG. 7.

Referring to FIG. 8, for the multi-pattern data, the hash matcher table 43, the sub matcher table 44, and the pattern hash value table 42 are configured.

The matching operation by the hash matcher 211, the matching operation by the light pattern matcher 217, and the exact pattern matching are the same as described in FIGS. 5 and 6, and thus a detailed description thereof is omitted. In the embodiment of FIG. 8, a result of precision pattern matching is included and stored in the sub pattern matrix 45. The sub pattern matrix 45 may be stored in a memory (not shown). As described above with reference to FIGS. 1 to 3, a full pattern matching operation may be performed with reference to the sub pattern matrix 45.

Figure 9:
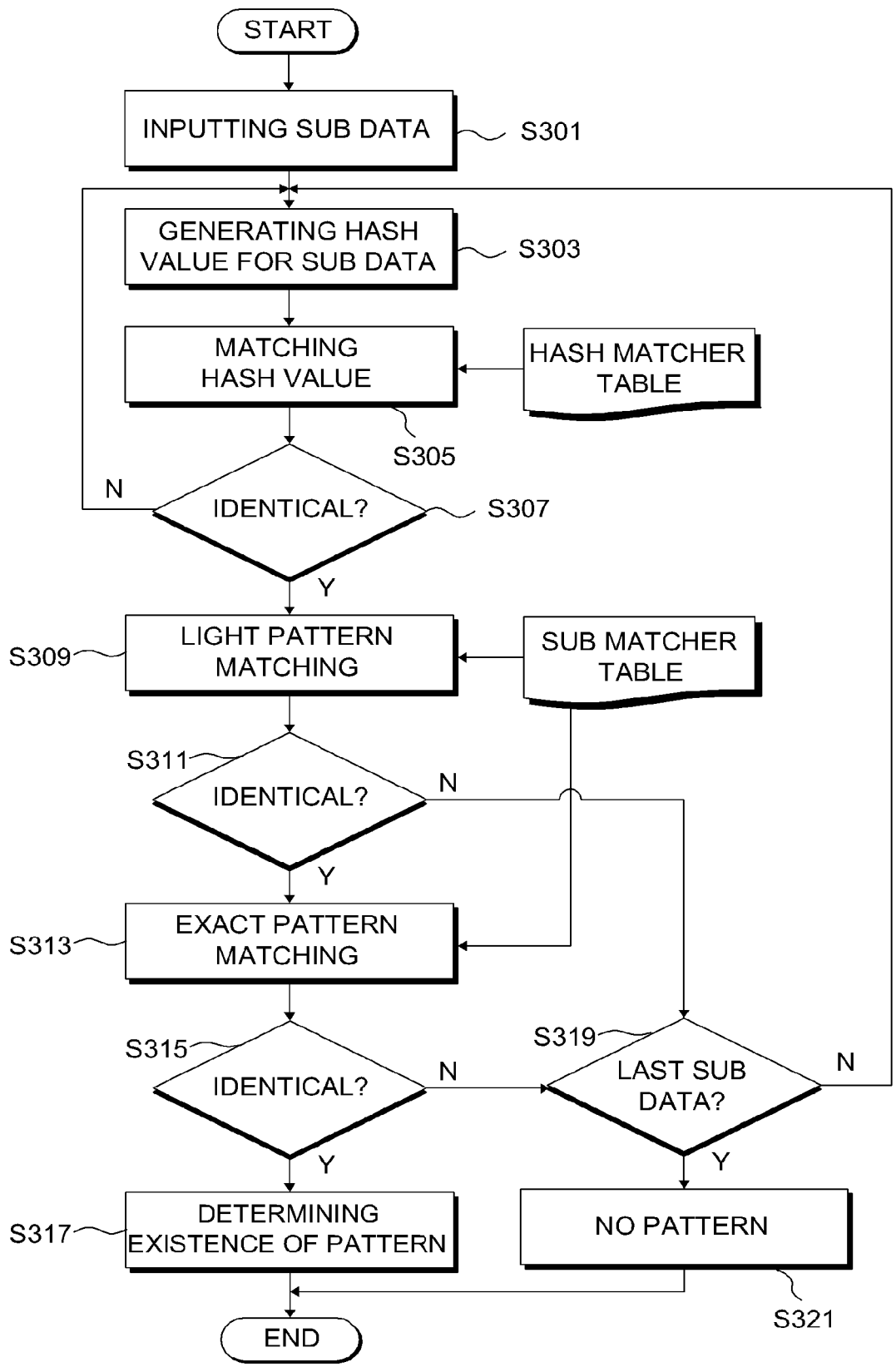
FIG. 9 is a flowchart illustrating a pattern matching method using a grammatically defined simple pattern data according to a first exemplary embodiment.

FIG. 9 is a flowchart illustrating a pattern matching method using a grammatically defined simple pattern data according to a first exemplary embodiment.

A target data may be divided into a plurality of sub data. If the sub data are input to the pattern matching system of the present disclosure (operation S301), the hash value generation unit 30 generates hash values for the sub data (operation S303). The hash value matching unit 60 performs a hash matching operation of matching the pre-stored hash matcher table 43 and the hash values of the sub data in sequence (operation S305).

If the hash value of one sub data, which is being currently matched, is identical to a value in the hash matcher table 43 as a result of the hash matching operation by the hash value matching unit 60 (operation 5370-Y), the light pattern matching unit 22 performs a light pattern matching operation with respect to a part of the current sub data (operation S309). In performing the light pattern matching operation, the sub matcher table 44 already generated by the table generation unit 70 is used.

If the part of the current sub data is identical to values in the sub matcher table 44 as a result of the light pattern matching operation (operation S311-Y), an exact pattern matching operation is performed with respect to the whole sub data (operation S313).

If the whole sub data are identical to the pattern data as a result of the exact pattern matching operation (operation S315-Y), the determination unit 10 determines that a pattern exists (operation S317).

In operation S315, if the sub data is not identical to the pattern data (operation S315-N), and if the current sub data is the last sub data (operation S319-Y), it is finally determined that there is no pattern in the target data (operation S321).

In operation S311, if the part of the sub data are not identical to values in the sub matcher table 44 (operation S311-N), and if the current sub data is the last sub data (operation S319-Y), it is finally determined that there is no pattern in the target data (operation S321).

In operation S319, if the current sub data is not the last sub data (operation S319-N), operation S303 resumes such that the hash matching operation is performed again with respect to the next sub data.

In FIG. 8, operation S303 resumes after operation S307 or S319. However, this is merely an example. Operation S301 may be performed at predetermined time intervals and returning to operation S303 in operation S307 or S319 may be omitted. Also, if the hash values are not identical in operation S307 (S307-N), the current sub data may be discarded along its hash value. If the sub data is not the last sub data in operation S319 (S319-N), the sub data, which has been exact-pattern matched or light-pattern matched, may be discarded. The pattern matching method illustrated in FIG. 9 is performed on the assumption that the target data input to the pattern matching system is a grammatically defined simple pattern data, and may be performed with only the sub pattern matching unit 20, the hash value generation unit 30, the storage unit 40, the hash value matching unit 60, and the table generation unit 70 of the pattern matching system of FIG. 1.

Figure 10:
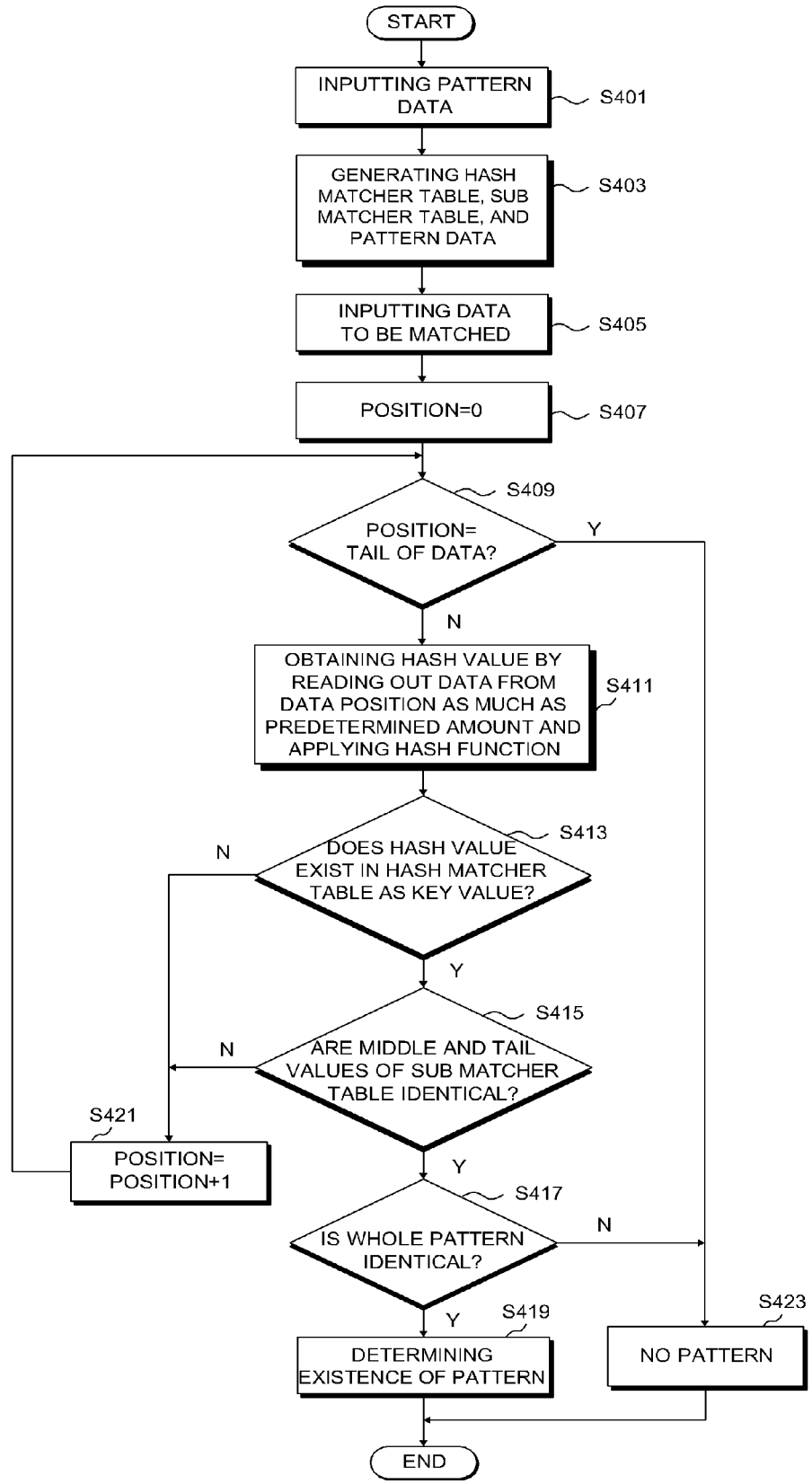
FIG. 10 is a flowchart illustrating a pattern matching method using a grammatically defined simple pattern data according to a second exemplary embodiment.

FIG. 10 is a flowchart illustrating a pattern matching method using a grammatically defined simple pattern data according to a second exemplary embodiment.

FIG. 10 illustrates a variation of the first embodiment of the pattern matching method using the grammatically defined simple pattern data of FIG. 9.

If a pattern data is input (operation S401), the hash value generation unit 30 generates a hash value for the pattern data and the table generation unit 70 generates the pattern hash value table 42, the hash matcher table 43, and the sub matcher table 44 using the hash value generated by the hash value generation unit 30.

After that, a target data consisting of a plurality of sub data is input to the pattern matching system of the present disclosure (operation S405).

If the target data is input, the sub pattern matching unit 20 performs a pattern matching operation from a first position of the sub data (operation S407). The first position of the sub data means a position '0'.

If the position of the current sub data is not a tail of the sub data when the pattern matching operation is performed while moving the position of the sub data, (operation S409-N), a hash value for the sub data is generated by reading out data from the current position of the sub data as much as a predetermined amount and applying a hash function to the read-out data (operation S411).

If the position of the sub data is the tail of the data in operation S409 (operation S409-Y), it is determined that there is no pattern in the current sub data (operation S423).

It is determined whether the hash value generated in operation S411 exists in the hash matcher table 43 or not (operation S413). If it is determined that the hash value exists in the hash matcher table 43 (operation S413-Y), it is determined whether a middle value and a tail value of the sub data are identical to those of the pattern data by referring to the sub matcher table 44 (operation S415).

If a middle value and a tail value of the sub data are identical to those of the pattern data in operation S415, the pattern matching operation is performed with respect to the whole pattern data using the sub matcher table 44, and if the whole pattern data is identical (operation S417-Y), it is determined that there is a pattern in the target data (operation S419). This means that malware including viruses exist in the target data.

If the whole pattern data is not identical in operation S417 (S417-N), it is determined that there is no pattern in the target data (operation S423). This means that there is no malware including viruses in the target data.

In operation S413, if the hash value to be matched does not exist in the hash matcher table 43 (operation S413-N) or if a middle value and a tail value of the sub data are not identical to those of the pattern data in the sub matcher table 44 (operation S415-N), the position of the sub data is changed by adding one byte to the current position of the sub data (S421) and then operation S409 resumes.

Figure 11:
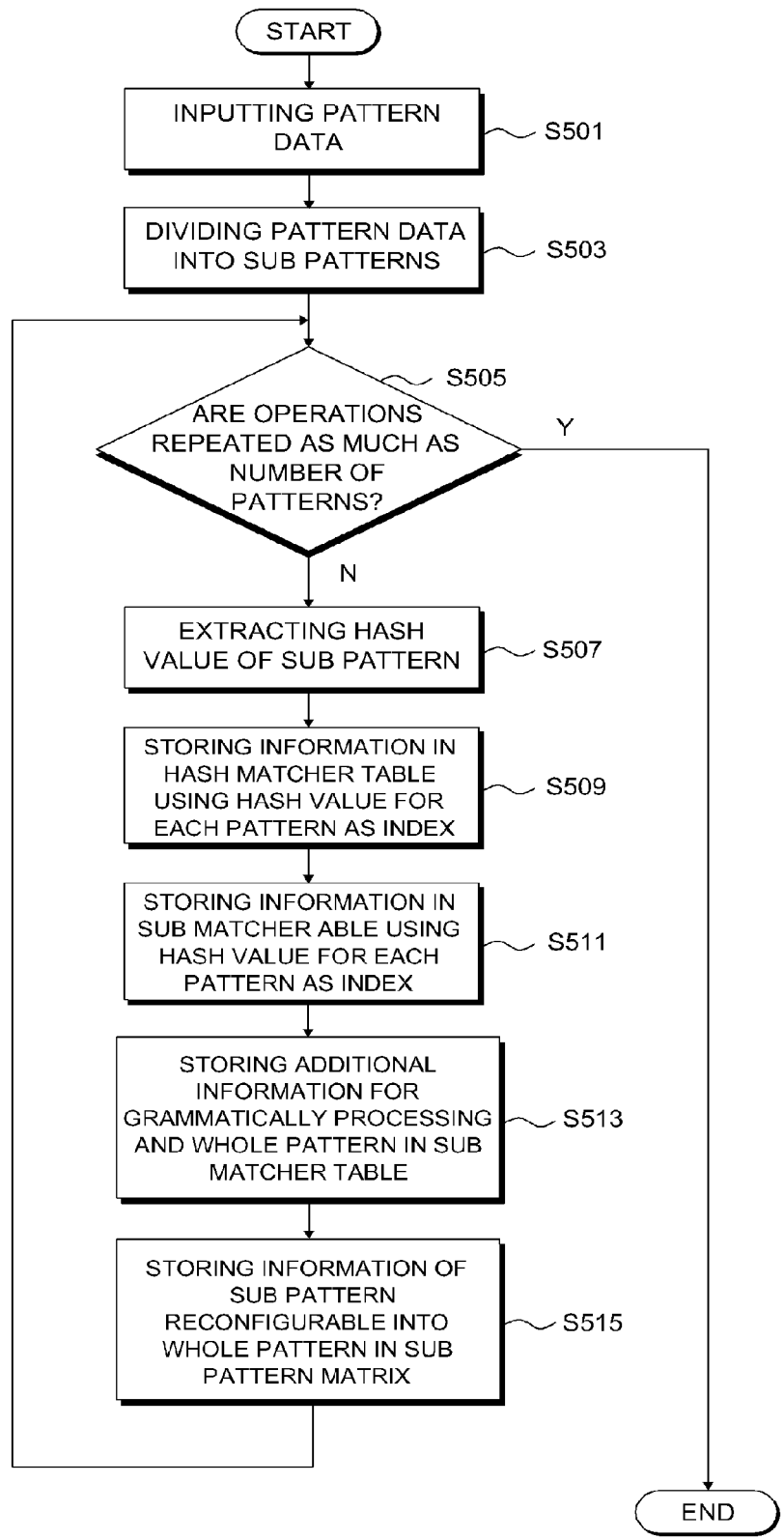
FIG. 11 is a flowchart illustrating a method for generating a sub pattern matrix for use in an operation of processing a grammatically defined complex pattern data.

FIG. 11 is a flowchart to explain an operation of processing a grammatically defined complex pattern data.

FIG. 11 is a flowchart illustrating a method for generating a sub pattern matrix for use in an operation of processing a grammatically defined complex pattern data.

If a pattern data is input (operation S501), the input pattern data is divided into sub patterns (operation S503).

It is checked whether operations S507 to S515 have been repeated for each sub pattern (operation S505). If operations S507 to S515 have been repeated as many as the number of sub patterns, the operation finishes, and if not, the next operation is performed.

A hash values to be used as an index for each sub pattern is generated (operation S507), corresponding information is recorded on the hash matcher table 43 using the hash value of each sub pattern as an index (operation S509), and corresponding information is recorded on the sub matcher table 44 using the hash value of each sub pattern as an index (operation S511).

Also, additional information for grammatically processing and the whole pattern is stored in the sub matcher table 44 (operation S513), and information of sub patterns reconfigurable into the whole pattern is stored in the sub pattern matrix 45 (operation S515).

Figure 12:
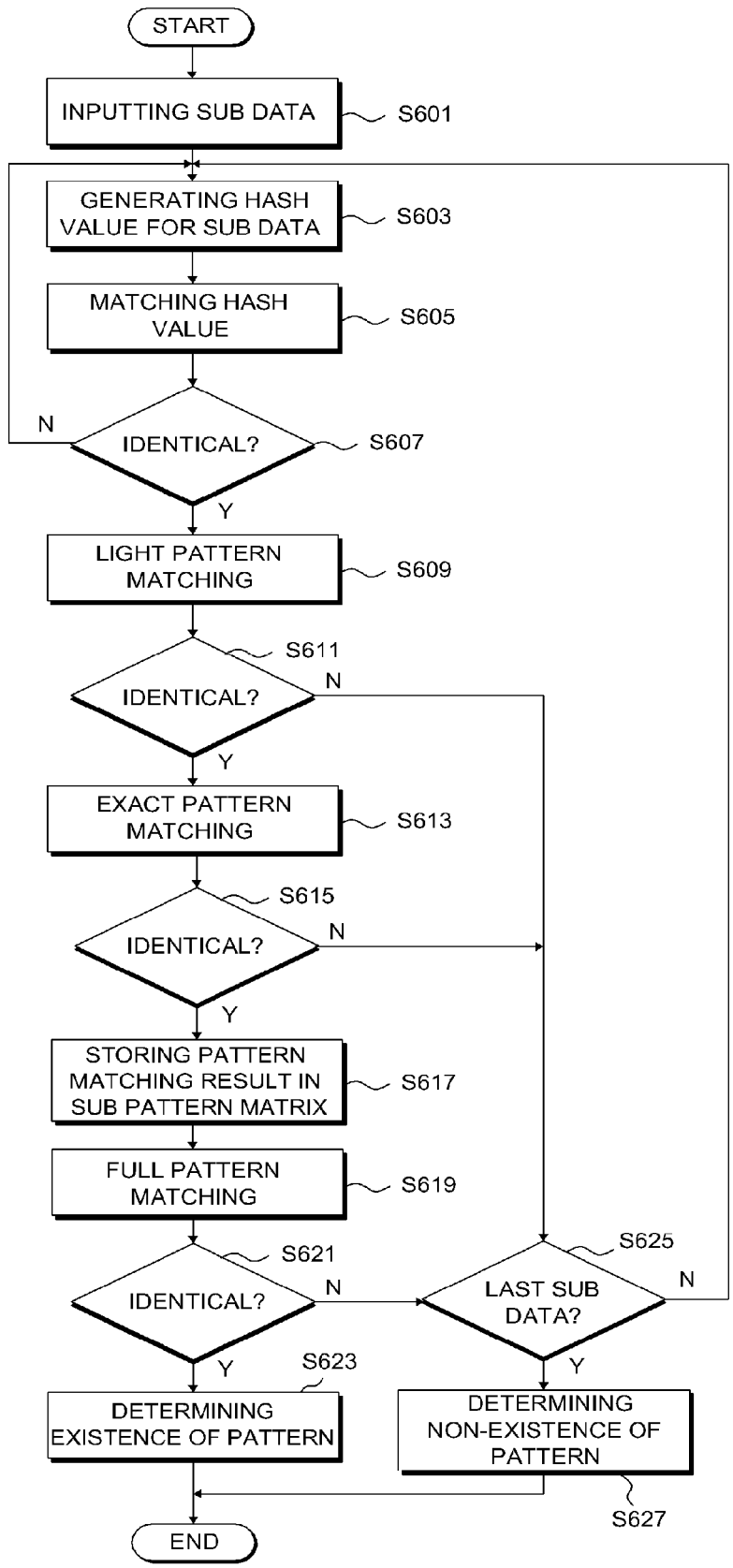
FIG. 12 is a flowchart illustrating a pattern matching method using a grammatically defined complex pattern data according to a first exemplary embodiment.

FIG. 12 is a flowchart illustrating a pattern matching method using a grammatically defined complex pattern data according to a first exemplary embodiment.

Sub data of a target data are input to the pattern matching system of the present disclosure (operation S601). The hash value generation unit 30 generates a hash value for each sub data (operation S603).

The hash value matching unit 60 performs a hash matching operation to match the hash values of the sub data and values in the hash matcher table 43 (operation S605).

If the hash value of one sub data being currently matched is identical to the hash value in the hash matcher tale 43 as a result of the hash matching operation of the hash value matching unit 60 (operation 5607-Y), the light pattern matching unit 22 performs a light pattern matching operation with respect to a part of the current sub data (operation S609). The sub matcher table 44 generated by the table generation unit 70 is used for the light pattern matching operation.

If the part of the current sub data is identical to a pattern data displayed on the sub matcher table 44 as a result of the light pattern matching operation (operation S611-Y), an exact pattern matching operation to match the whole sub data is performed (operation S613).

If the whole sub data are identical to the pattern data (S615-Y) as a result of the exact pattern matching operation (operation S615-Y), the result of the precision pattern matching operation is stored in the sub pattern matrix 45 (S617).

After that, an operation of comparing the sub pattern matrix 45 with a pattern data is performed (full pattern matching operation) (operation S619).

If the matching between the pattern data and the target data is successful as a result of the full pattern matching operation (operation S621-Y), the determination unit 10 determines that there is a pattern in the target data (operation S623).

If the matching in operation S615 or S621 is not successful (S615-N or S621-N), it is determined whether the current sub data is the last sub data or not (operation S625).

If the current sub data is the last sub data (operation S625-Y), the determination unit 10 finally determines that there is not pattern in the target data (operation S627)

If the current sub data is not the last sub data (operation S625-N), operation S603 resumes such that the matching operation with respect to the next sub data is performed.

In this embodiment, operations S601 to S615 are the same as operations S301 to S315 of FIG. 9. In other words, the operation of processing the multi-pattern data further performs the full pattern matching operation after performing the operations of processing a grammatically defined simple pattern.

Figure 13:
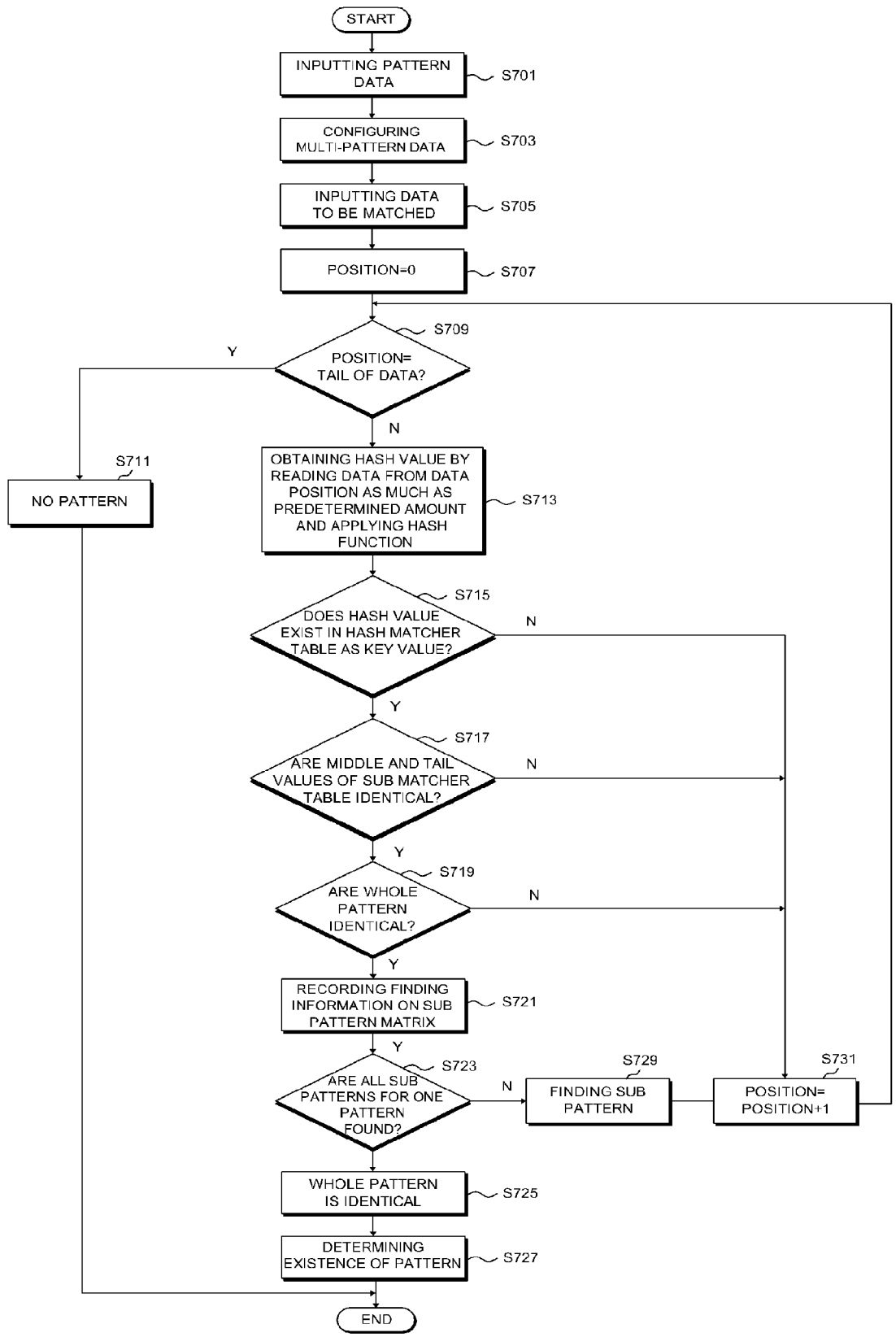
FIG. 13 is a flowchart illustrating a pattern matching method using a grammatically defined complex pattern data according to a second exemplary embodiment.

FIG. 13 is a flowchart illustrating a pattern matching method using a grammatically defined complex pattern data according to a second exemplary embodiment.

A pattern data is loaded (operation S701) and the loaded pattern data is divided into sub patterns for constituting a multi-pattern data (operation S703). A method for constituting the multi-pattern data is the same as illustrated in FIG. 11.

A target data to be matched is input (operation S705). A pattern matching operation is performed from a first byte of the input data while moving by one byte. In other words, the pattern matching is performed from a position '0' of the input data while moving by one byte (operation S707).

It is determined whether the position of the input target data is a tail of the data or not (operation S709). If the current position of the data is the tail of the data (operation S709-Y), it is determined that there is no identical pattern in the input data (operation S731).

If the position of the input target data is not the tail of the data (operation S709-N), a hash value is generated by reading out data from the current position of the target data as much as a predetermined amount and applying a hash function to the read-out data (operation S711).

The hash value matching unit 60 determines whether the hash value calculated in operation S713 exists in the hash matcher table or not (operation S715). If the hash value calculated in operation S713 exists as a key value (operation S715-Y), a sub pattern matching operation is performed by comparing a middle value and a tail value of the sub data and a middle value and a tail value of the sub matcher table 44 and checking whether the middle value and the tail value of the sub data are identical to those of the sub matcher table 44 (operation S717).

On the other hand, if the hash value of the sub data does not exist as the key value (operation S715-N), a 1 byte is added to the current position of the sub data (operation S731) and then operation S709 resumes.

Next, if the sub pattern matching is successful (operation S717-Y), a matching operation for the whole real pattern data is performed using the sub matcher table 44 (operation S719). If the sub pattern matching is not successful in operation S717, a 1 byte is added to the current position of the sub data (operation S731) and then operation S709 resumes.

If the whole pattern data is identical to the pattern data as a result of the exact pattern matching, corresponding information is recorded on the sub pattern matrix 45 (operation S721).

Next, it is determined whether all of the sub patterns of the complex pattern data have been found or not (operation S723). If all of the sub patterns constituting the complex pattern data have been founded in operation S723, it is determined that there is the complex pattern in the target data (operations S725 and S727).

On the other hand, if all of the sub patterns of the complex pattern data have not been found in operation S723, it is determined that some of sub patterns has been found and a 1 byte is added to the current position of the sub data and then operation S709 resumes (operations S729 and S731).

Figure 14:
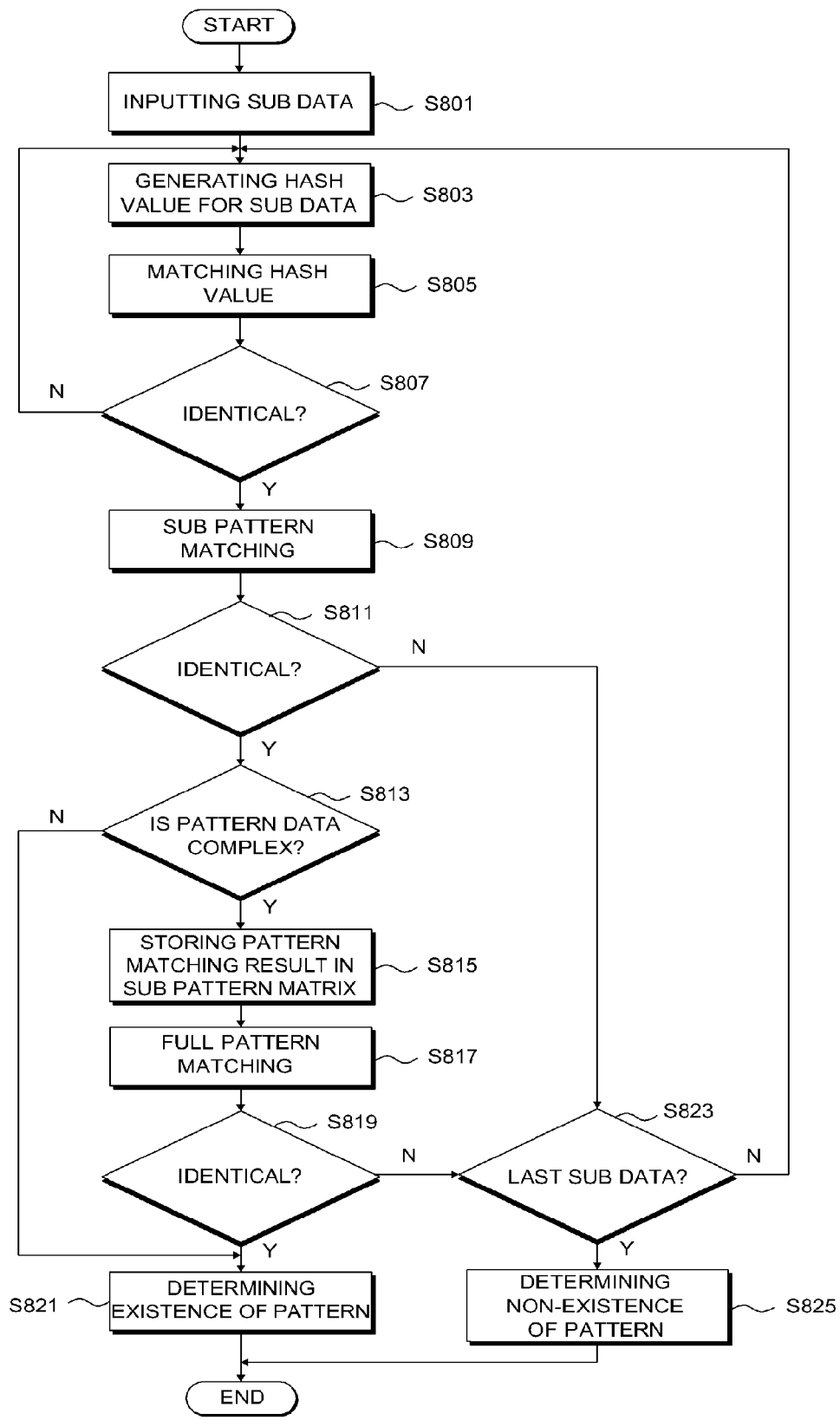
FIG. 14 is a flowchart illustrating a pattern matching method using a grammatically undefined pattern data.

FIG. 14 is a flowchart illustrating a pattern matching method using a grammatically undefined pattern data according to an exemplary embodiment.

A sub data is input to the pattern matching system of the present disclosure (operation S801). The hash value generation unit 30 generates a hash value for the sub data by applying a hash function (operation S803).

The hash value matching unit 60 performs a hash matching operation using the hash matcher table 43. In other words, the hash value matching unit 60 performs a matching operation to determine whether the hash value for the sub data exists in the hash matcher table 43 (operation S805).

If it is determined that the sub data being currently matched is identical to a value in the hash matcher table 43 as a result of the hash matching operation of the hash value matching unit 60 (operation S807-Y), the sub pattern matching unit 20 performs a sub pattern matching operation (S809). Operation S809 may include a light pattern matching operation and an exact pattern matching operation.

If the current sub data is identical to the values in the sub matcher table 44 as a result of the sub pattern matching operation of the sub pattern matching unit 20 (operation S811-Y), it is determined whether a pattern data matched with the sub data is a complex pattern data or not (operation S813).

If it is determined that the sub data corresponds to the pattern data of the complex pattern (operation S813-Y), the result of the pattern matching operation is stored in the sub pattern matrix 45 (operation S815).

After that, by referring to the sub pattern matrix 45, the full pattern matching unit 50 determines whether there exist all sub patterns of the pattern data or not (operation S817). If it is determined that all sub patterns exist, i.e., if the sub data is identical to the pattern data (operation S819-Y), the determination unit 10 determines that there is a pattern in the target data (operation S821).

If all of the sub data of the pattern data do not exist in the sub pattern matrix 45 (operation S819-N) and if the current sub data is the last sub data (operation S823-Y), the determination unit 10 determines that there is no pattern in the target data (operation S825)

Also, if the sub data is not determined to be identical to the values in the sub matcher table 44 (operation S811-N), it is determined whether the current sub data is the last sub data or not. If the current sub data is the last sub data, it is determined that the there is no pattern in the target data (operation S825).

As described above, FIG. 14 illustrates the case in which the type of the target data input to the pattern matching system is not defined. According to the pattern matching method of FIG. 4, it is firstly determined whether the target data is a grammatically defined simple pattern or not, and if so, further operation is not performed. If the target data is not the grammatically defined simple pattern data, it is secondly determined whether the target data is a grammatically defined complex pattern or not. Therefore, regardless whether the pattern type of the target data is defined or not, the pattern matching can be exactly performed.

According to the exemplary embodiment, the pattern matching operation can be swiftly performed with respect to the grammatically complex or simple malware pattern.

According to the exemplary embodiment, the full pattern matching operation is performed only if the hash matching and the sub matching are successful. Therefore, even if the target data to be pattern-matched is greater, the pattern matching operation can be swiftly performed.

According to the exemplary embodiment, since the patter matching system is realized in the form of the SoC, a resource problem of a mobile device such as a limited speed or battery can be solved.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A malware pattern matching method comprising:
generating a hash matcher table comprising a hash value item displaying a hash value and an item displaying a pre-stored malware pattern data, or comprising the hash value item displaying the hash value and an item displaying whether a hash value of the pre-stored malware pattern data is identical to the hash value displayed on the hash value item;
dividing a target data into a plurality of sub data;
for at least one sub data of the plurality of sub data, generating a hash value of the sub data and comparing the generated hash value of the sub data and the hash matcher table;
generating a sub matcher table which comprises the hash value item displaying the hash value and a malware pattern data item displaying a malware pattern data corresponding to the hash value displayed on the hash value item;
only in response to the hash value of at least one sub data of the plurality of sub data existing in the hash matcher table, performing a sub pattern matching operation to match the at least one sub data of the plurality of sub data with the corresponding pre-stored malware pattern data by using the sub matcher table;
determining a type of the pre-stored malware pattern data;
in response to a determination that the type of the pre-stored malware pattern data is a grammatically complex malware pattern, performing a full pattern matching operation to determine whether the target data is identical to at least the pre-stored malware pattern data by referring to a result of the sub pattern matching operation; and in response to a determination that the type of the pre-stored malware pattern data is a grammatically simple malware pattern, not performing the full pattern matching operation,
wherein performing the sub pattern matching operation comprises:
performing a light pattern matching operation to match a part of the one sub data with the pre-stored malware pattern data by using the sub matcher table; and
if the part of the one sub data is identical to or included in the pre-stored malware pattern data, performing an exact pattern matching operation to match a whole of the one sub data with a whole of the pre-stored malware pattern data.

2. The malware pattern matching method as claimed in claim 1, wherein, in response to the determination that the type of the pre-stored malware pattern data matched with the one sub data is part of the grammatically complex malware pattern, the result of the sub pattern matching operation is recorded on a sub pattern matrix.

3. The malware pattern matching method as claimed in claim 2, wherein the performing the full pattern matching operation comprises checking whether the sub pattern matching operation matches all malware sub patterns included in the sub pattern matrix.

4. The malware pattern matching method as claimed in claim 1, further comprising recording the result of the sub pattern matching operation on a sub pattern matrix,
wherein the performing the full pattern matching operation comprises checking whether the sub pattern matching operation matches all malware sub patterns included in the sub pattern matrix.

5. The malware pattern matching method as claimed in claim 1, wherein the part of the one sub data is at least one of a head value, a middle value, and a tail value of the one sub data.

6. The malware pattern matching method as claimed in claim 1, wherein the sub matcher table further comprises a middle value item displaying a middle value of the pre-stored malware pattern data and a tail value item displaying a tail value of the pre-stored malware pattern data.

7. The malware pattern matching method as claimed in claim 1, wherein the pattern data item displays an address where the pre-stored malware pattern data is stored or displays the pre-stored malware pattern data.

8. The malware pattern matching method as claimed in claim 1, wherein the sub matcher table further comprises a collision pattern offset item displaying a collision pattern offset value indicating whether one of the hash values of the pre-stored malware pattern data collides with another of the hash values of the pre-stored malware pattern data.

9. The malware pattern matching method as claimed in claim 8, wherein, if the one of the hash values of the pre-stored malware pattern data collides with the other of the hash values of the pre-stored malware pattern data, the collision pattern offset item displays the one of the hash values.

10. The malware pattern matching method as claimed in claim 1, wherein the performing the sub pattern matching operation comprises:
searching for a hash value identical to the hash value of the one sub data among the hash values displayed on the hash value item of the sub matcher table; and
comparing a malware pattern data corresponding to the searched for hash value and the one sub data.

11. The malware pattern matching method as claimed in claim 10, wherein the comparing comprises:

performing a light pattern matching operation to match a part of the one sub data with the pre-stored malware pattern data; and
only if the part of the one sub data is identical to or included in the pre-stored malware pattern data, performing an exact pattern matching operation to match a whole of the one sub data with the pre-stored malware pattern data.

12. The malware pattern matching method as claimed in claim 10, wherein the sub matcher table further comprises a collision pattern offset item displaying an collision pattern offset value indicating whether one of the hash values of the pre-stored malware pattern data collides with another of the hash values of the pre-stored malware pattern data,
wherein the pattern matching method further comprises, if an offset value exists in the collision pattern offset item, comparing a malware pattern data indicated by the offset value and the one sub data.

13. A malware pattern matching method comprising:
generating a hash matcher table comprising a hash value item displaying a hash value and an item displaying a malware pattern data of a pre-stored malware pattern database or comprising the hash value item displaying the hash value and an item indicating whether hash values of the malware pattern data of the pre-stored pattern database are identical to the hash values displayed on the hash value item;
dividing a target data into a plurality of sub data;
for at least one sub data of the plurality of sub data, generating a hash value of the sub data and comparing the generated hash value of the sub data and the hash matcher table;
generating a sub matcher table which comprises the hash value item displaying the hash value and a malware pattern data item displaying a malware pattern data corresponding to the hash value displayed on the hash value item;
only in response to the hash value of at least one sub data of the plurality of sub data existing in the hash matcher table, performing a light pattern matching operation to match a part of the at least one sub data of the plurality of sub data with a malware pattern data of a pre-stored malware pattern database by using the sub matcher table; and
performing an exact pattern matching operation to match a whole of the one sub data with the malware pattern data only if the part of the one sub data is identical to or included in the malware pattern data.

14. The malware pattern matching method as claimed in claim 13, wherein the sub matcher table further comprises a collision pattern offset item displaying a collision pattern offset value indicating whether one of the hash values of the malware pattern data collides with another of the has values of the malware pattern data.

15. A malware pattern matching system, comprising:
a target data dividing unit which, using a processor, divides a target data into a plurality of sub data;
a storage unit which stores a hash matcher table comprising a hash value item displaying a hash value and an item displaying a pre-stored malware pattern data, or comprising the hash value item displaying the hash value and an item displaying whether a hash value of the pre-stored malware pattern data is identical to the hash value displayed on the hash value item;
a hash value matching unit which matches a hash value of at least one sub data of the plurality of sub data with the hash matcher table;

a sub pattern matching unit which, only in response to the hash value of at least one sub data of the plurality of sub data existing in the hash matcher table, matches the at least one sub data of the plurality of sub data with the corresponding pre-stored malware pattern data;

a full pattern matching unit that, in response to the one sub data not being identical to the malware pattern data matched with the hash value of the one sub data after the matching operation of the sub pattern matching unit, matches the target data with the malware pattern data by referring to a matching result of the sub pattern matching unit; and a determination unit that, in response to the one sub data being identical to the malware pattern data matched with the hash value of the one sub data after the matching operation of the sub pattern matching unit, does not operate the full pattern matching unit and determines that the malware pattern data is included in the target data, wherein the sub pattern matching unit comprises:
a light pattern matching unit which is operable to match a part of the one sub data with a sub matcher table; and
an exact pattern matching unit which matches a whole of the one sub data with the pattern data, if the part of the one sub data is identical to those of the sub matcher table, wherein the sub matcher table comprises the hash value item displaying the hash value and a malware pattern data item displaying a malware pattern data corresponding to the hash value displayed on the hash value item.

16. The malware pattern matching system as claimed in claim 15, further comprising a pattern hash value generator which generates a hash value included in the hash matcher table.

17. A malware pattern matching system, comprising:

a target data dividing unit which, using a processor, divides a target data into a plurality of sub data;

a storage unit which stores a hash matcher table comprising a hash value item displaying a hash value and an item displaying a pre-stored malware pattern data, or comprising the hash value item displaying the hash value and an item displaying whether a hash value of the pre-stored malware pattern data is identical to the hash value displayed on the hash value item;

a hash value matching unit which matches a hash value of at least one sub data of the plurality of sub data with the hash matcher table;

a sub pattern matching unit which, only in response to the hash value of at least one sub data of the plurality of sub data existing in the hash matcher table, matches the at least one sub data of the plurality of sub data with the corresponding pre-stored malware pattern data;

a full pattern matching unit which is operable to match the target data with a whole of the pre-stored malware pattern data; and a determination unit which determines whether to operate the full pattern matching unit according to a type of the pre-stored malware pattern data, wherein the type of the pre-stored malware pattern data is a grammatically defined complex malware pattern or a grammatically defined simple malware pattern, wherein the malware pattern matching system further comprises a determination unit that, in response to the type of the pre-stored malware pattern data being the grammatically defined simple malware pattern, does not operate the full pattern matching unit, and wherein, in response to the type of the pre-stored malware pattern data being the grammatically defined complex malware pattern, the determination unit controls the full pattern matching unit to be operated after the matching operation of the sub pattern matching unit, wherein the sub pattern matching unit comprises:
a light pattern matching unit which is operable to match a part of the one sub data with a sub matcher table; and
an exact pattern matching unit which matches a whole of the one sub data with the pattern data, if the part of the one sub data is identical to those of the sub matcher table, wherein the sub matcher table comprises the hash value item displaying the hash value and a malware pattern data item displaying a malware pattern data corresponding to the hash value displayed on the hash value item.

18. The malware pattern matching method as claimed in claim 1, wherein the target data is data to be checked to determine whether or not malware exists therein.

\* \* \* \* \*